(12) United States Patent
Jones et al.

(10) Patent No.: US 7,698,577 B2
(45) Date of Patent: Apr. 13, 2010

(54) COMMUNICATION SYSTEM ACTIVATION

(75) Inventors: William W. Jones, San Diego, CA (US); Ragnar H. Jonsson, Reykjavik (IS)

(73) Assignee: Mindspeed Technologies, Inc., Newport Beach, CA (US)

( * ) Notice: Subject to any disclaimer, the term of this patent is extended or adjusted under 35 U.S.C. 154(b) by 555 days.

(21) Appl. No.: 11/415,651

(22) Filed: May 2, 2006

(65) Prior Publication Data

US 2006/0277404 A1 Dec. 7, 2006

Related U.S. Application Data

(63) Continuation of application No. 09/972,717, filed on Oct. 5, 2001, now abandoned.

(51) Int. Cl.
*G06F 1/32* (2006.01)
(52) U.S. Cl. .................. 713/300; 713/320; 713/323
(58) Field of Classification Search ......... 713/320–324, 713/300
See application file for complete search history.

(56) References Cited

U.S. PATENT DOCUMENTS

| | | | |
|---|---|---|---|
| 4,041,381 A | 8/1977 | Hwa | |
| 4,535,206 A | 8/1985 | Falconer | |
| 4,597,183 A | 7/1986 | Broding | |
| 4,719,643 A | 1/1988 | Beeman | |
| 4,947,425 A | 8/1990 | Grizmala et al. | |

(Continued)

FOREIGN PATENT DOCUMENTS

EP 0880258 A2 11/1998

(Continued)

OTHER PUBLICATIONS

Cambridge University Press; Numerical Recipes Software in C: The Art of Scientific Computing; Correlation and Autocorrelation Using the FFT; pp. 545 through 548; 1982-1992.

(Continued)

*Primary Examiner*—Mark Connolly
*Assistant Examiner*—Paul B Yanchus, III
(74) *Attorney, Agent, or Firm*—Weide & Miller, Ltd.

(57) ABSTRACT

In one embodiment a communication device activation system is provided to restore activation of one or more communication devices that are in a powered-down mode to conserve power usage during a period of inactivity. The activation signal, also referred to as a warm start signal, comprises a sequence signal. A sequence generator generates a desired sequence signal. It is contemplated that one or more sequence signals may be selected for use by the activation system. The sequence signal may be generated or stored and retrieved. To resume communication, a wake-up sequence signal is generated and transmitted to a remote communication device. Upon receipt the received signal is filtered, correlated and analyzed. Analysis may compare one or more aspects of the signal to a threshold signal. If the signal is determined to comprise a wake-up signal, i.e. a request for communication, then a warm-start operation may occur. An acknowledgement signal may optionally be generated to acknowledge receipt of the signal. In one embodiment one or more sequence signals are utilized to monitor channel characteristics and adjust communication device settings accordingly. This may occur as part of the wake-up process.

29 Claims, 18 Drawing Sheets

U.S. PATENT DOCUMENTS

| | | | |
|---|---|---|---|
| 4,963,020 A | 10/1990 | Luthra et al. |
| 4,968,880 A | 11/1990 | Beller |
| 4,980,585 A | 12/1990 | Bazes |
| 5,029,184 A | 7/1991 | Andren et al. |
| 5,062,703 A | 11/1991 | Wong et al. |
| 5,144,250 A | 9/1992 | Little |
| 5,319,482 A | 6/1994 | Tsuchiya et al. |
| RE34,972 E | 6/1995 | Horiguchi et al. |
| 5,514,965 A | 5/1996 | Westwood |
| 5,523,758 A | 6/1996 | Harmuth |
| 5,570,217 A | 10/1996 | Fleuren |
| 5,600,248 A | 2/1997 | Westrom et al. |
| 5,621,518 A | 4/1997 | Beller |
| RE35,607 E | 9/1997 | Nagamune et al. |
| 5,699,402 A | 12/1997 | Bauer et al. |
| 5,745,167 A | 4/1998 | Kageyu et al. |
| 5,841,666 A | 11/1998 | Perdue et al. |
| 5,870,428 A | 2/1999 | Miller et al. |
| 5,884,231 A | 3/1999 | Perdue et al. |
| 5,940,439 A | 8/1999 | Kleider et al. |
| 5,956,323 A | 9/1999 | Bowie |
| 5,974,433 A | 10/1999 | Currie |
| 6,002,671 A | 12/1999 | Kahkoska et al. |
| 6,028,661 A | 2/2000 | Minami et al. |
| 6,049,885 A | 4/2000 | Gibson et al. |
| 6,058,162 A | 5/2000 | Nelson et al. |
| 6,064,695 A | 5/2000 | Raphaeli |
| 6,075,628 A | 6/2000 | Fisher et al. |
| 6,122,652 A | 9/2000 | Jin et al. |
| 6,151,493 A | 11/2000 | Sasakura et al. |
| 6,161,077 A | 12/2000 | Fawcett |
| 6,215,793 B1 | 4/2001 | Gultekin et al. |
| 6,215,855 B1 | 4/2001 | Schneider |
| 6,229,599 B1 | 5/2001 | Galtarossa |
| 6,237,013 B1 | 5/2001 | Usui |
| 6,292,539 B1 | 9/2001 | Eichen et al. |
| 6,298,118 B1 | 10/2001 | Liggett |
| 6,344,749 B1 | 2/2002 | Williams |
| 6,374,375 B1 | 4/2002 | Yip et al. |
| 6,385,561 B1 | 5/2002 | Soraghan et al. |
| 6,392,750 B1 | 5/2002 | Field et al. |
| 6,396,856 B1 | 5/2002 | Sucha et al. |
| 6,417,672 B1 | 7/2002 | Chong |
| 6,426,971 B1 | 7/2002 | Wu et al. |
| 6,434,221 B1 | 8/2002 | Chong |
| 6,437,578 B1 | 8/2002 | Gumm |
| 6,480,504 B1 | 11/2002 | Wang et al. |
| 6,509,740 B1 | 1/2003 | Needle et al. |
| 6,512,610 B1 | 1/2003 | Minami et al. |
| 6,532,215 B1 | 3/2003 | Muntz |
| 6,534,996 B1 | 3/2003 | Amrany et al. |
| 6,534,997 B1 | 3/2003 | Horishita et al. |
| 6,535,551 B1 | 3/2003 | Sweitzer et al. |
| 6,542,228 B1 | 4/2003 | Hartog |
| 6,547,453 B1 | 4/2003 | Stummer et al. |
| 6,570,915 B1 | 5/2003 | Sweitzer et al. |
| 6,590,889 B1 | 7/2003 | Preuss et al. |
| 6,633,545 B1 | 10/2003 | Milbrandt |
| 6,646,451 B2 | 11/2003 | Lanan |
| 6,647,058 B1 | 11/2003 | Bremer et al. |
| 6,671,311 B1 | 12/2003 | Raphaeli et al. |
| 6,711,207 B1 | 3/2004 | Amrany et al. |
| 6,829,252 B1 | 12/2004 | Lewin et al. |
| 6,829,293 B2 | 12/2004 | Jones et al. |
| 2002/0097468 A1 | 7/2002 | Mecherle et al. |
| 2002/0109879 A1 | 8/2002 | Wing So |
| 2002/0114383 A1 | 8/2002 | Belge et al. |
| 2003/0048835 A1 | 3/2003 | Noma et al. |

FOREIGN PATENT DOCUMENTS

| | | | |
|---|---|---|---|
| GB | 2303754 A | 2/1997 |
| JP | 09321674 A | 12/1997 |

OTHER PUBLICATIONS

Jack P.E. Glas; Code Selection; last modified on Nov. 13, 1996.
Jack Glas; Circuit Systems; The Principles of Spread Spectrum Communication; last modified Aug. 29,1996 (internet research).
Dr. George Zimmerman; PairGain Technologies; HDSL2 Tutorial: Spectral Compatibility and Real-World Performance Advances; Jun. 23, 1998; Sweden; pp. 1 through 12.
U.S. Appl. No. 60/244,308.
Sam Shearman; National Instruments; Tone Detection Fits Waveform Frequency in LabVIEW 6i; 4 pages circa unknown.
Autocorrelation; The MathWorks, Inc. 1994-2000; 32 pages.
Publisher: IEEE; Steven A. Newton; Novel Approaches to Optical Reflectometry; pp. 329-333; 1990.
Taylor, V. and Faulkner, M.; Line Monitoring and Fault Location Using Spread Spectrum on Power Line Carrier; Published in IEEE Proc.- Gender. Transm. Distrb., vol. 143, No. 5, Sep. 1996; pp. 427-434.
Hwang, L., Rinne, G. and Turlik, I.; An Extended Time Domain Network Analysis Measurement Technique; Published in IEEE Transactions on Components, Packaging, and Manufacturing Technology, Part B, vol. 18, No. 2, May 1995; pp. 375-380.
Dhaene, T., Martens, L. and Zutter, D.; Calibration and Normalization of Time Domain Network Analyzer Measurements; Published in IEEE Transactions on Microwave Theory and Techniques, vol. 42, No. 4, Apr. 1994; pp. 580-589.
Hayden, L. And Tripathi, V.; Calibration Methods for Time Domain Network Analysis; Published in IEEE Transactions on Microwave Theory and Techniques, vol. 41, No. 3, Mar. 1993; pp. 415-420.
Su, W., and Riad, S.; Calibration of Time Domain Network Analyzers; Published in IEEE Transactions of Instrumentation and Measurement, vol. 42, No. 2, Apr. 1993; pp. 157-161.
Boets, P. and Van Biesen, L.; The Modeling Aspect of Transmission Line Networks; 1992; pp. 137-141.
Munk, A. and Cusick, J.; A Time Domain Analysis of a Calibration Error Model; 1991; pp. 22-26.
Pintelon, R., and Van Biesen, L.; Identification of Transfer Functions With Time Delay and Its Application to Cable Fault Location; Published in IEEE Transactions on Instrumentation and Measurement, vol. 39, No. 3, Jun. 1990; pp. 479-484.
Van Biesen, L., Renneboog, J. and Barel, A.; High Accuracy Location on Faults on Electrical Lines Using Digital Signal Processing; Published in IEEE Transactions on Instrumentation and Measurement, vol. 39, No. 1, Feb. 1990; pp. 175-179.
Navaneethan, S.; Soraghan, J.J.; Siew, W.H.; McPherson, F.; Gale, P.F.; Automatic Fault Location Using Intelligent Processing; International Conference on Electric Power Engineering, 1999 PowerTech Budapest 99; Aug. 29-Sep. 2, 1999; pp. 29.
Navaneethan, S.; Soraghan, J.J.; Siew, W.H.; Muirhead, R.; Livie, J.; An Automatic Fault Detection and Location Technique in Low Voltage Distribution Networks; Proceedings Int'nl Conf. On Energy Management and Power Delivery; vol. 2; Mar. 1998; pp. 732-736.
Cisco Systems, Inc.; Configuring the Cisco 90 Series DSL Management Agent; pp. 1-6 (Internet research dated Jun. 26, 2000).
Cisco Systems, Inc.; Configuring Subscriber Equipment for Use with the Cisco 90i IDSL Channel Unit; pp. 1-8 (internet research dated Jun. 26, 2000).

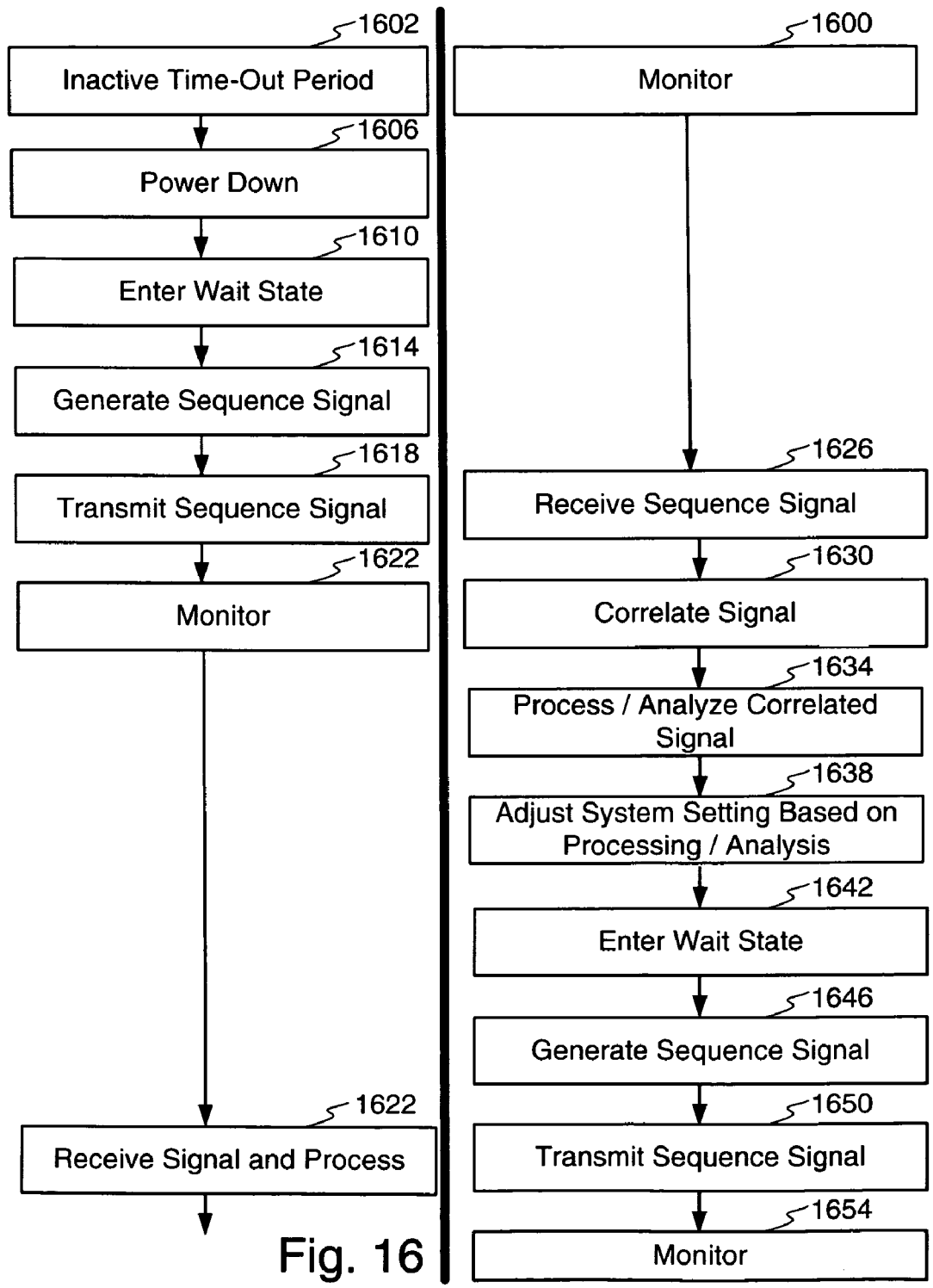

COMMUNICATION SYSTEM ACTIVATION

PRIORITY CLAIM

This application is a continuation of and claims priority to U.S. patent application Ser. No. 09/972,717 filed Oct. 5, 2001 now abandoned.

FIELD OF THE INVENTION

The invention is in the field of communications and in particular the invention concerns activation or wake-up signals for a communication system.

RELATED ART

Electronic communication between two or more remote locations has become a common method for exchanging information. In fact, the popularity in modern communication systems has strained the ability of communication service providers to meet the infrastructure requirements and provide the support systems for modern communication systems. For example, installation and operation of numerous such as hundreds or thousands of communication devices at a communication service providers central office requires large amounts of power and electronic device cooling capacity. Such power costs become expensive and may limit growth or profits.

In addition, existing communication facilities, in which the communication systems are installed, are already built-out. Renovating or remodeling a communication facility to accommodate additional power feeds or additional cooling capability may also limit growth or profits.

Moreover, users demand that modern communication systems provide higher rates of information transfer. Often the higher data transfer rates must occur over existing infrastructure, such as twisted pair copper. Communication cabling is often installed in bundles of conductors that are installed underground or overhead. Because the cabling is bundled together the individual conductors are adjacent other conductors. As a result, signals traveling on one line may generate electrical fields that effect communication on the other lines in the bundle. This effect can be problematic as data transfer rates increase and the number of conductors in the bundle that are in use at any one time also increases.

Hence, as the number of conductors in use in the bundle for data communication increases so to does the signal sensitivity that each conductor is carrying. These two factors operate against each other to present challenges to communication service providers attempting to provide high-speed communication services.

As a result of these situations that arise from the popularity of high-speed communication systems there exists a need for methods and apparatus to overcome such drawbacks. As described below in greater detail, the methods and apparatus described below provide solutions to alleviate these and other problems.

SUMMARY

The invention may be implemented in various embodiments. In one embodiment a sequence signal is provided to serve as a wake-up signal. Use of a sequence signal provides advantages over signals of the prior art by overcoming the effects of noise and requiring less power during transmission. These advantages result in a high success rate of wake-up signal detection and a lower rate of false detects.

In one embodiment an apparatus for restoring operation of a communication system after a period of inactivity is provided. The communication system comprises at least a first communication device and a second communication device and the system comprises a sequence generator located at the first communication device and configured to generate a sequence signal upon request to initiate communication after a period of inactivity. A transmitter is located at the first communication device and is configured to transmit the sequence signal to the second communication device. The sequence signal is intended to initiate operation of the second communication device. A receiver located at the second communication device may be configured to receive the sequence signal. A correlator connects to the receiver and correlates the received sequence signal. A signal processor located at the second communication device is configured to process the correlated signal to determine if the received signal is a sequence signal that signals a request to initiate operation.

It is further contemplated that the apparatus may further include an activity detection system configured to provide an indication to the communication system upon a period of inactivity between the first communication device and the second communication device. The sequence signal may comprise an M-sequence. In one configuration, the signal processor is configured to compare points of correlation, if any, of the correlated signal, to a threshold signal to determine if the first communication device is requesting a restart of communication. The correlation may comprise cross correlation. The period of inactivity is intended to at least reduce the power consumption of a communication system.

In one embodiment, a method for reducing power consumption of one or more communication devices during periods of inactivity comprises detecting a period of inactivity followed by entering into a mode of reduced power consumption. Thereafter, receiving a request to resume communication and generating a sequence signal in response to the request. The operation then transmits the sequence signal to a remote location to initiate communication.

In various embodiments the method further includes monitoring and receiving signals at a remote location and correlating received signals to analyze the correlated signal to determine if the received signal qualifies as a request to resume communication.

In one embodiment the period of inactivity comprises a period of time when the one or more communication devices are not exchanging data. The request to resume communication may comprise a request for data from a user of one or more communication devices. In one embodiment the method further includes periodically sending a channel monitoring signal to periodically obtain updated information regarding the channel.

In one embodiment a method is provided for processing a received signal to determine if the received signal is a request to initiate a warm start operation. A received signal is filtered to create a filtered signal and thereafter, the filtered signal is correlating with a sequence signal to generate a correlated signal. The method then analyzes the points of correlation in the correlated signal to determine if the received signal is a request to resume communication. In one embodiment the analyzing comprises comparing the correlated signal with a threshold signal to determine if the correlated signal is a request for communication. The method may further include the step of initiation of a warm start operation if the analyzing reveals that the points of correlation match designated points of correlation. A finite impulse response filter may be used to perform correlation and the received signal may be a sequence signal.

In yet another embodiment a method for periodically modifying communication device settings to account for changes in a communication channel is provided and comprises sending a sequence signal from a first location to a second location over the communication channel. At the second location the signal is received and filtered. Thereafter, the signal is correlated at the second location with a duplicate of the sequence signal to obtain a correlated signal processed using the correlated signal to determine changes in the communication channel.

In one variation, the method further includes modifying the communication device settings, based on the processing, to account for changes in the communication channel. The sequence signal may comprise an M-sequence type sequence signal. The communication channel may comprise one or more twisted pair conductors. In one embodiment the method further includes sending a sequence signal from the second location to the first location, receiving the sequence signal at the first location, filtering the sequence signal at the first location, correlating the sequence signal at the first location with a duplicate of the sequence signal to obtain a correlated signal and processing the correlated signal to determine changes in the communication channel.

In another embodiment, a method for updating communication device settings to aid in executing a warm start operation may be provided. In such an embodiment the method comprises receiving a sequence signal and correlating the sequence signal. After correlation processing the correlated sequence signal is used to determine current channel characteristics and adjust the communication device settings based on the correlation results. This method may further including comparing the current channel characteristics to channel characteristics at a time prior to the processing and modifying the communication settings if the comparison determines the current channel characteristics are different than the channel characteristics at a time prior to the processing. In one configuration the adjusting assists in the warm start operation by adjusting the communication device settings to match current channel characteristics. A warm start may comprise a resumption of communication device operation after a period of inactivity. The communication device may comprise a device operating under a digital subscriber line standard. The sequence signal may comprise a sequence signal based on an M-sequence.

One method of operation determines whether to initiate a warm start operation or a cold start operation for one or more communication devices. An example of this method comprises generating a sequence signal at a first device and transmitting the sequence signal to a second device. At the second device, receiving the sequence signal at the second device and correlating the sequence signal at the second device. After correlating, analyzing the correlated signal at the second device to determine current channel characteristics. The method then compares the current channel characteristics to at least one prior channel characteristic and then selects between a warm start operation and a cold start operation based on the comparison.

Variations to this example method may further include transmitting a sequence signal to the first device from the second device. The adjusting may include adjusting at least one setting of the second device based on the analyzing. In one embodiment selecting comprises selecting a warm start operation if the comparing reveals the channel characteristics have not changed beyond a threshold level and selecting a cold start operation if the comparing reveals the channel characteristics have changed beyond a threshold level. The cold start operation may take a longer period of time to complete than the warm start operation.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

FIG. 16 illustrates an operational flow diagram of an alternative method of operation channel analysis on a period.

DETAILED DESCRIPTION

Figure 1:
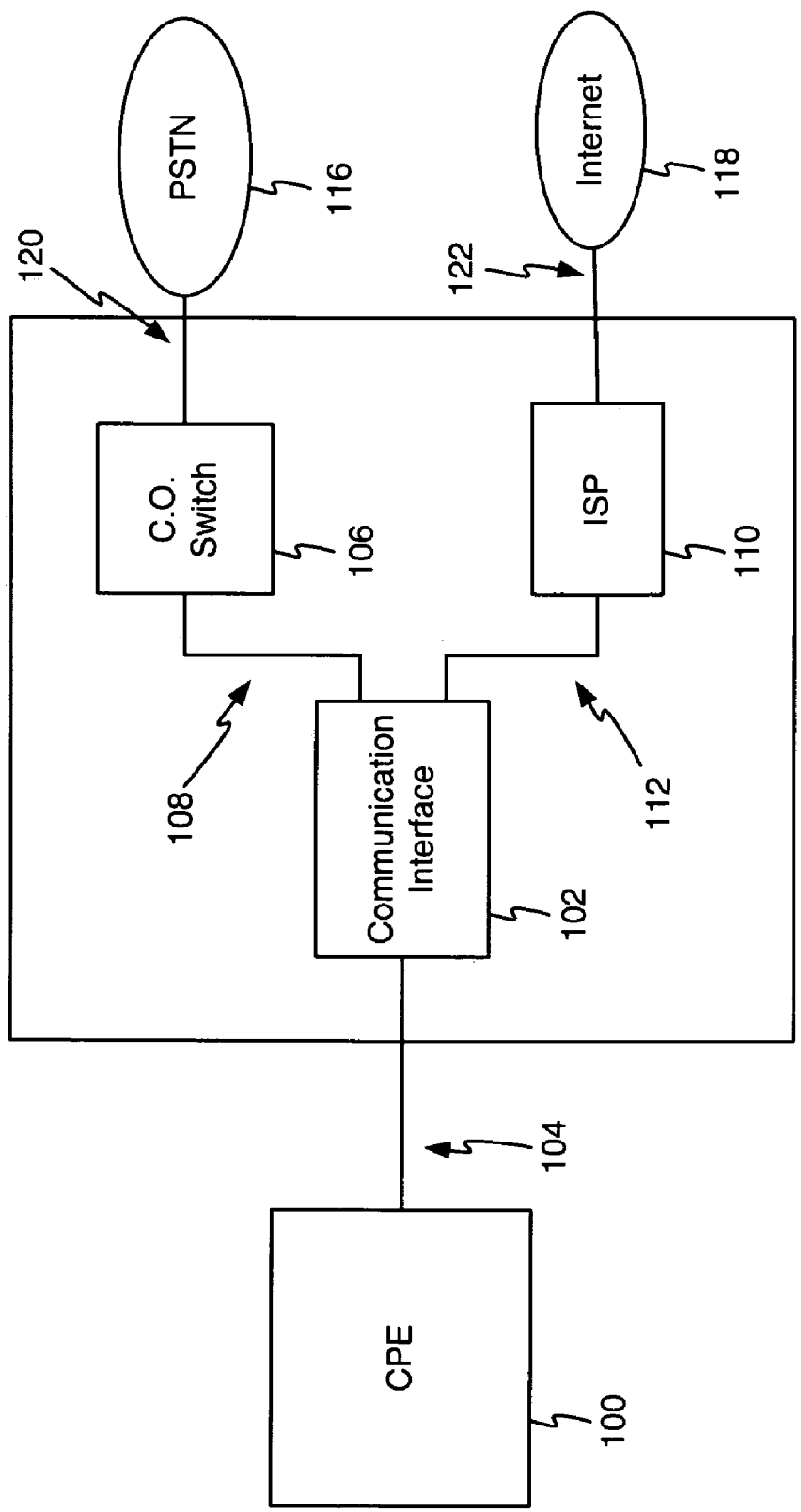
FIG. 1 is a block diagram of an example environment of use of the invention.

FIG. 1 illustrates an example environment for use of the invention. The example environment shown in FIG. 1 is provided for purposes of discussion and is not in any way intended to limit the scope or breadth of the invention. It is contemplated that the invention may find use in a plurality of other environments, such as any environment where it is desired to perform system activation or line analysis to determine if a particular type of line activation is appropriate. The line may comprise any type of conductor or channel including, but not limited to, a twisted pair conductor, coaxial cable, Ethernet, an optic channel, or a radio frequency waveguide.

FIG. 1 illustrates customer premise equipment (CPE) 100 in communication with a communication interface 102 over a first line 104. The CPE 100 comprises any communication device that is generally located remote from the communication interface 102 and configured to facilitate communication over the first line 104. In one embodiment, the CPE 100 comprises a communication modem or communication device located at a business or residence. The CPE 100 may comprise, but is not limited to, any device operating under the digital subscriber line (DSL) standard, any voice band modem, cable modem, wireless modem, power line modem, or any other device configured to perform digital or analog communication. It is contemplated that, contained in the CPE 100 and the communication interface 102, there is a receiver and transmitter configured to send and receive data over the line 104.

The first line 104 may comprise any communication medium intended to carry communication signals. In various embodiments the first line 104 comprises, but is not limited to, one or more conductors of a twisted pair of conductors, coax cable, power line, optic cable. Although the first line 104 is shown as a single line, it should be understood that the line 104 may comprise any configuration or number of conductors, optical paths, or other such paths. Other lines, channel, or paths or conductors shown throughout the figures may likewise comprise any configuration or number of conductors, optical paths, or other such paths.

In this embodiment, the communication interface 102 comprises any communication equipment configured to communicate with the CPE 100 over the first line 104. With regard to the DSL standard, the communication interface 102 may comprise a digital subscriber line access multiplexer (DSLAM). A DSLAM is configured to facilitate communication over the first line 104 between the CPE 100 and a central office (CO) switch 106 and an Internet Service Provider (ISP) 110. The DSLAM may include modems or other communication devices.

Communication with the CO switch 106 occurs over a second line 108 while communication with the ISP 110 occurs over a third line 112. The communication interface 102 appropriately routes certain voice communication from the CPE 100 to the CO switch 106 while appropriately routing certain data communication from the CPE to the ISP 110. As shown, the CO switch 106 may connect to the PSTN 116 thereby serving as a switching and routing service for telephone, facsimile, or data calls. The ISP 110 may connect to the Internet 118 to provide access to a plurality of other networked computers.

It is contemplated that the various embodiments of the invention may be used to generate, transmit, receive and process wake-up or activation signals for use in initiating a restart process for a communication device/system that was previously in a sleep or powered down state. It is desired to utilize a signal that is least affected by channel noise and provides the highest percentage of detection and the lowest percentage of missed detection. It is also desired to provide a system that is backward compatible with prior communication system. In one embodiment, the invention is integrated with modems at the communication interface 102, the C.O. switch 106, or the communication interface 102. The invention may also be used to determine a line characteristics or parameters for each leg or path for symmetrical communication (generally equal data transmission rates between devices) or asymmetrical communication (different data transmission rates between devices).

The term warm-start means a process of initiating communication between two or more remotely located communication devices. The terms wake-up and activation may be used interchangeable. In one embodiment, a warm start operation is different than a cold start operation in that the warm start operation may be faster, may require less channel retraining and may only be performed if the characteristics or parameters of the channel have not changed beyond a threshold level from the characteristics or parameters that existed when the communication systems initiated sleep mode. By way of example, sleep mode may be initiated between CPE 100 and the communication interface 102.

Figure 2:
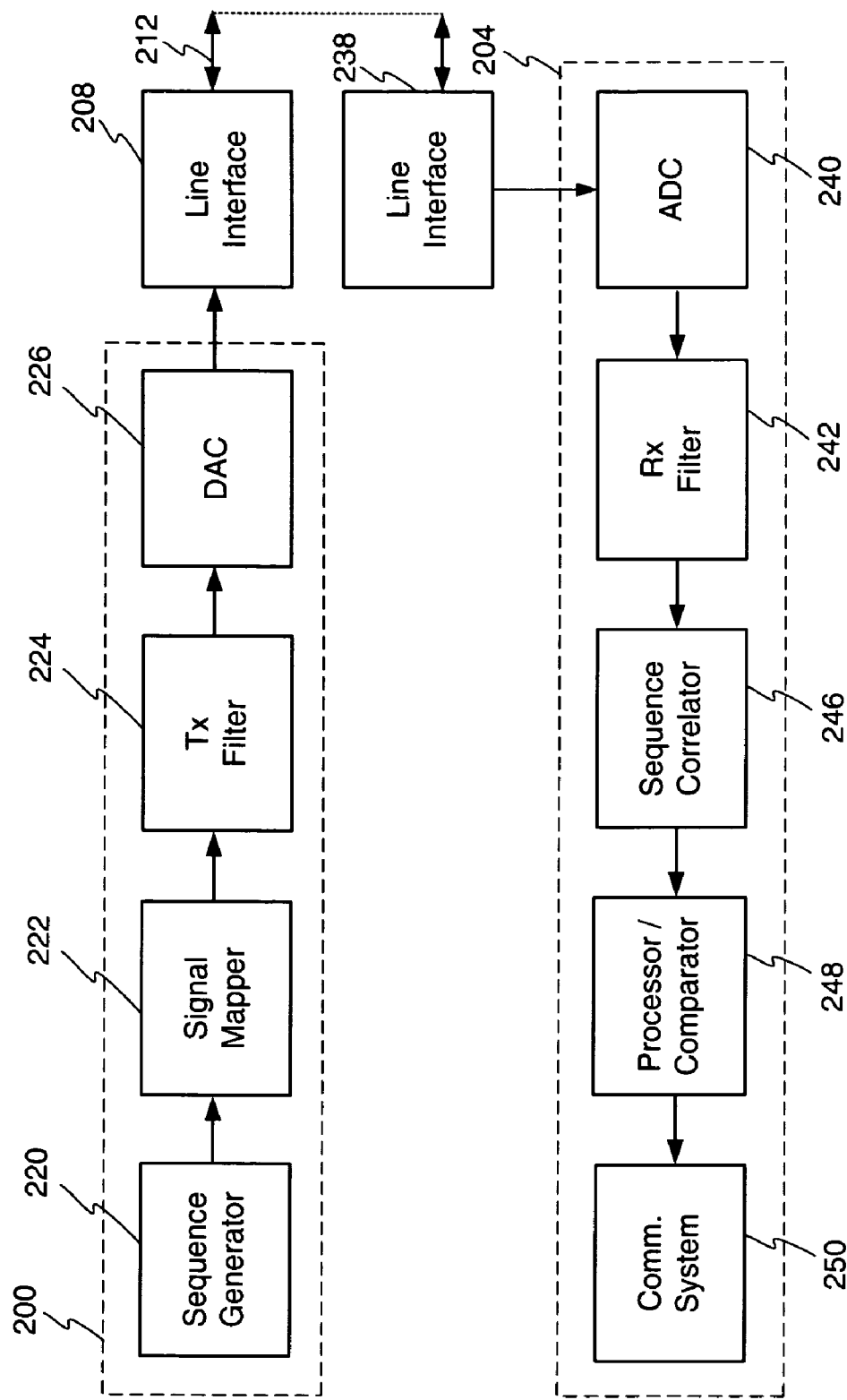
FIG. 2 is a block diagram of an example embodiment of a system configured with one embodiment of the invention.

FIG. 2 illustrates a more detailed block diagram of an example embodiment of one configuration of the invention. Broadly, the elements of FIG. 2 includes a transmit module 200 and a receive module 204. Connecting the transmit module 200 and the receive module 204 is a line interface 208 and other possible logic and lines (not shown). The line interface 208 connects the transmit module 200 and the receive module 204 to a communication channel 212. The line interface 212 includes apparatus to separate or filter the transmitted signal from the received signal and attempts to impedance match the transmit module 200 to the channel 212 and the receive module 204 to the channel. In one embodiment, the line interface 208 comprises a hybrid. The line interface 208 may also be configured to interface a single conductor of the transmit module 200 or the receive module 204 to twisted pair conductors. Although designed to reduce impedance mismatch, the line interface 212 often creates some mismatch.

In the example embodiment of the transmit module 200 shown in FIG. 2, a sequence generator 220 connects to a PAM mapping module 222. The sequence generator 220 generates a sequence signal. The output of the PAM mapping module connects to one or more transmit filters 224. The transmit filters 224 provide the sequence signals to a digital to analog converter 226 and the output of the analog to digital converter connects to the line interface 208. A channel 212 connects the two line interfacing 208, 238.

With regard to the receive module, the line interface 238 is configured to receive and direct any received signals to an analog to digital converter 240. The output of the analog to digital converter 240 connects to one or more receive filters 242 and the output of the receive filters connects to a sequence correlator 246. The output of the sequence correlator 246 connects to a processor or comparator module 248, which in turn connects to a communication system 250.

Transmit Module

The function of each element of the transmit module 200 is now briefly described with more emphasis on the elements that are of greater importance to the operation of the invention and which may not be as well known. The sequence generator 220 comprises any apparatus or system configured to generate a sequence signal for transmission over the channel 212. In one embodiment the sequence generator 220 comprises at least partly software. In one embodiment the sequence generator creates a maximal length sequence (M-sequence). In another embodiment the sequence generator 220 creates a Barker Code type sequence. In yet another embodiment, the sequence generator 220 creates a Kasami type sequence. In the embodiment shown in FIG. 2 having a sequence correlator 246, it is desirable for the sequence to have good autocorrelation or cross correlation properties.

In one embodiment, the sequence generator 220 is embodied in a scrambler to generate a pseudorandom bit pattern or sequence in an attempt to output a data stream without long sequences of constant voltage values. Various different embodiments exist for generating a sequence signal.

The signal mapper 222 transforms the digital output of the sequence generator to any various signal levels that represent bit values. For example, four bits of digital data may be represented as 16 PAM, i.e. any of 16 different numerical values. The 16 different values may be represented on a scale of minus one to seven eighths in increments of ⅛. The signal may be scaled by an amplifier to yield a desired transmit power. In one embodiment the signal mapper 222 comprises a table look-up device or process that translates the binary input to a numeric output.

The transmit filter 224 is configured to manipulate the output data to adhere to desired or required spectral requirements. For example, frequency filtering may occur to improve system performance by tailoring the frequency content of the output or it may simply be mandated by FCC or a standards organization. It may be desired to attenuate out-of-band energy while also minimally effecting in-band energy. The embodiment shown in FIG. 2 implements spectral shaping with a digital filter. An analog filter may serve to reject images of the digital processing. Another embodiment eliminates any digital transmit filter. In such an embodiment, the spectral shaping is provided by the analog filter.

The digital to analog converter 226 is generally understood to convert a digital signal to an analog signal. In the embodiment shown, the transmission on the line occurs in an analog format.

Although not shown, an analog filter may also be included just prior to the line interface 208 in the transmit module 200 to perform final filtering of the analog waveform to spectrally prepare the signal for transmission over the channel 212. The analog filter may operate similarly to the transmit filter 224 but in the analog domain.

Example Sequences

In one configuration, the sequence generator 220 or other device with similar capabilities generates a sequence defined by varying the polynomial of the sequence generator to provide different sequence signals. In another configuration, the polynomial is selected to maximize the period of the sequence, such as to create an M-sequence. As described above, the period of a length-maximized sequence is defined as $2^m-1$ where m is the number of stages of shift registers used to generate the sequence.

By varying the number of stages m, the period is controlled. Various advantages may be gained by varying the period of the sequence. For example, one advantage of increasing the period of the sequence comprises mitigation of the effects of correlated additive noise such as crosstalk. In the correlator, the noise component is decorrelated which spreads the noise across all frequencies thus reducing the amount of noise in the frequency band of interest. This improves the likelihood of accurate signal detection and accuracy of the channel analysis, if performed. Another advantage of increasing the period of the sequence is that the system can provide a more complete response thereby improving accuracy. Yet another advantage of increasing the period of the sequence is that the analysis is based on more tones with finer frequency spacing.

An advantage of a shorter period generated by using a smaller m value is that the sequence may be generated and analyzed more rapidly. This speeds the process. Another advantage of shorter period sequences is a lowering of the computational complexity in the receiver.

Although numerous specific sequences are provided below, it is contemplated that any type sequence may be used. The text Introduction to Spread Spectrum Communications written by Peterson, Ziemer and Borth, (Prentice Hall, 1995), which is incorporated herein in its entirety, provides a discussion on different sequences and in particular different types of M-sequences. Table 3-5, from the above-referenced text, provides a list of primitive polynomials that may be used to generate the sequence. Any sequence period may be selected. Other sequence signals that are contemplated for use with the invention also exist.

In general, numerous M-sequences exist with periods that depend on the number of stages in the shift register used to generate the sequence signal. There is at least one M-sequence for every integer greater than one where this integer represents the number of stages of the shift register. If more than one M-sequence exists for a given number of stages then the sequences are distinguished by the non-zero taps of the shift register. This is designated by the polynomial representation. In one embodiment of the invention, a sequence having a period of 31 is generated by a modem or other communication device, which may be located at any point along a communication channel. One polynomial defined by a period of 31 is:

$$s(n)=s(n-2)\oplus s(n-5)\oplus f(n)$$

where f(n) is the logical ones input to the sequence generator, s(n−k) is the tap point after the k-th delay element in the sequence generator and $\oplus$ is modulo-2 addition.

Another example polynomial that may be generated by a communication terminal and is defined by a period equal to 63 is:

$$s(n)=s(n-1)\oplus s(n-6)\oplus f(n)$$

Another example polynomial that may be generated by a communication terminal and is defined by a period equal to 127 is:

$$s(n)=s(n-3)\oplus s(n-7)\oplus f(n)$$

Another example polynomial that may be generated by a communication terminal and is defined by a period equal to 255 is:

$$s(n)=s(n-2)\oplus s(n-3)\oplus s(n-4)\oplus s(n-8)\oplus f(n)$$

In another embodiment of the invention, a sequence having a period of 31 may be generated by a communication terminal and adopted for use as a sequence signal. One polynomial defined by a period of 31 is:

$$s(n)=s(n-3)\oplus s(n-5)\oplus f(n)$$

where f(n) is the logical ones input to a sequence generator, s(n−k) is the tap point after the k-th delay element in the sequence generator and $\oplus$ is modulo-2 addition.

Another example polynomial that may be generated by a communication terminal and is defined by a period equal to 63 is:

$$s(n)=s(n-5)\oplus s(n-6)\oplus f(n)$$

Another example polynomial that may be generated by a communication terminal and is defined by a period equal to 127 is:

$$s(n)=s(n-4)\oplus s(n-7)\oplus f(n)$$

Another example polynomial that may be generated by a communication terminal and is defined by a period equal to 255 is:

$$s(n)=s(n-4)\oplus s(n-5)\oplus s(n-6)\oplus s(n-8)\oplus f(n)$$

The term communication terminal is defined to mean any configuration of software, hardware or both software and hardware configured to facilitate or perform communication or generate a signal or sequence. In one embodiment the term communication terminal is defined to be a modem. This includes a modem, scrambler, sequence generator or other similar device, or a separate, stand-alone device located at the CPE or C.O. end.

Using the sequence signals, generated by the sequence generator, scrambler, or any other device capable of generating a corresponding sequence signal provides advantages over the prior art.

Receive Module

The receive module 204 of FIG. 2 includes the analog to digital converter 240 to transform the received sequence signal from the analog domain to the digital domain. An amplifier (not shown) may be placed between the line interface 208 and the analog to digital converter 240 to amplify the possibly weak sequence signal from the channel 412. In one embodiment, the analog to digital converter 240 comprises a fourteen bit converter. Increasing the precision of the converter improves the dynamic range of the receiver allowing both small and large magnitude signals to be detected, such as those from a very long and very short transmission lines.

The receiver filters 242 comprise standard filters such as high and low pass filters to eliminate unwanted frequency components that are outside of the frequency band of the sequence signal. Any type of digital filtering may be performed by the filters 242. In addition, analog filters (not shown) may be located prior to the analog to digital converter 240 as necessary to filter noise or other signals received from the line interface 238 prior to conversion into the digital domain.

The sequence correlator 246, which receives the output of the receiver filters 242, comprises a configuration of hardware, software, or combination thereof, that is configured to correlate the sequence signal with a copy or duplicate of an original sequence signal that was generated by the sequence generator 220. Although not shown, the sequence correlator 246 may communicate or connect to the sequence generator 220. In one embodiment, the correlation comprises cross correlation. Mathematically, in one embodiment, a crosscorrelator is realizing the following function:

$$h(n) = \sum_k C(k)X(k+n)$$

where X(n) is the sum of the transmitted sequence C(n) plus any additive noise and crosstalk. In one embodiment the correlator 246 is embodied using a sliding tapped delay line. There are numerous ways to implement the correlator 246 and this is but one example embodiment. The correlator 246 may be embodied in hardware, or software, or a combination of the two. Indeed, it is contemplated that an analog implementation of the correlator maybe preferred particularly in high rate applications. In this implementation analog to digital converter 240 maybe omitted. In the sliding tapped delay line method the taps are C(n).

The output of the sequence correlator 246 feeds into a processing and comparator device 248 (hereinafter processor/comparator 248). The processor/comparator 248 is capable of performing either or both of a processing of the correlated signal. The processing may occur to determine if the received sequence signal is indeed a wake-up signal, i.e. a request to resume communication. In one embodiment the processor 248 may also perform channel analysis to determine the characteristics of the channel. In such an embodiment a comparator may compare the correlated signal to a stored signal, such as a threshold signal, that represents a signal that would be received had a warm start signal be sent. Based on this comparison a determination can be made whether to resume communication. It may be desired to resume communications after a period of inactivity which was entered into to reduce power consumption, heat generation, and/or noise on adjacent communication lines. A warm start operation is one manner to resume communication. It is contemplated that a warm start operation may occur more rapidly than a cold start operation. One factor that may determine whether a warm start operation will occur instead of a cold start operation is changes in channel characteristics.

The channel characteristics may be analyzed and used to modify the communication device settings, possibly on an ongoing basis, to thereby improve operation and reduce the time it takes to resume communication. A comparison may occur between the channel characteristics at a time prior to the end of the period of inactivity and current channel characteristics obtained by the analysis. This comparison may reveal the extent of the changes and the appropriateness of a warm start operation or a cold start operation.

It is further contemplated that the transmission and detection of a sequence signal may occur for any desired reason other than to initiate a warm start operation. By way of example and not limitation, use of a sequence signal may also be used to for synchronization, channel estimation or fault identification. Accordingly, the output of the processor/comparator 248 connects to other aspects of a communication system 250. The communication system may comprise any type communication system. One communication system 250 comprises a system conforming to a digital subscriber line (DSL) standard. Another communication system 250 comprises a cable modem. The invention may be implemented with any communication system 250.

Figure 3:
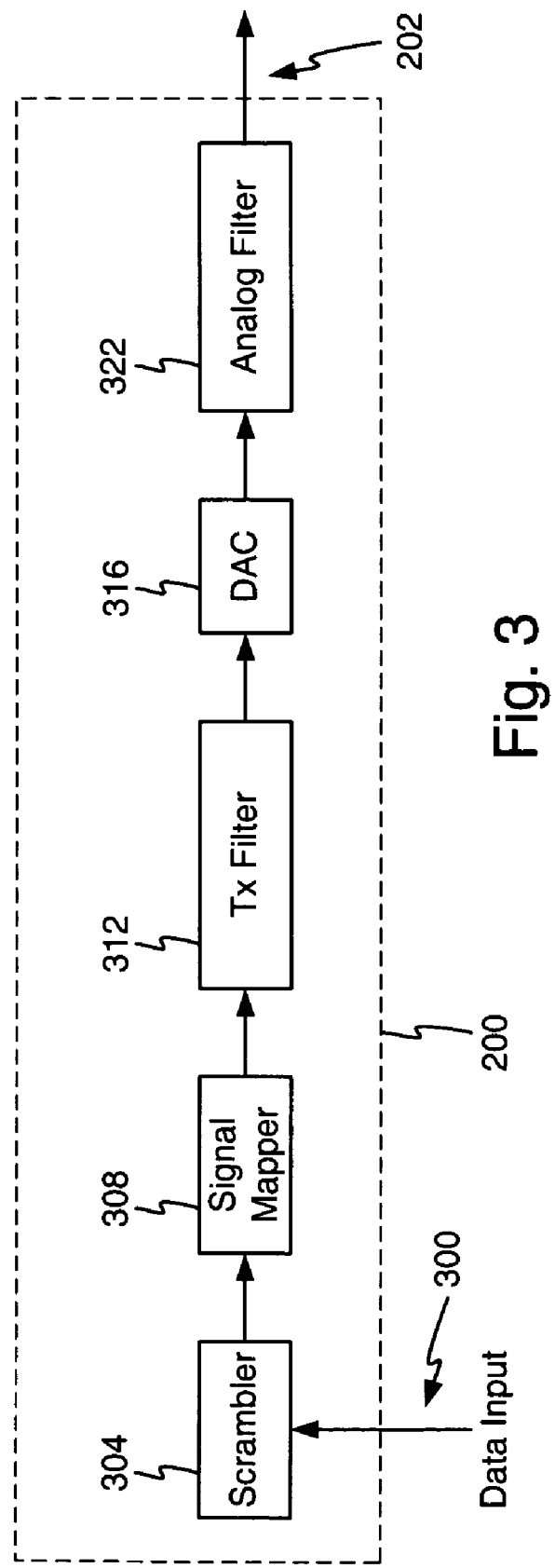
FIG. 3 illustrates a more detailed block diagram of an example embodiment of the transmitter shown in FIG. 2.

FIG. 3 illustrates a more detailed block diagram of an example embodiment of the transmitter 200 shown in FIG. 2. It should be understood that this is an example embodiment provided for purposes of enablement. The invention is not limited to this example embodiment. The transmitter 200 includes a data input 300 connected to a scrambler 304. The output of the scrambler 304 feeds into a signal mapper 308, which in turn connects to a transmit filter 312. The output of the transmit filter 312 provides the filtered signal to a digital to analog converter 316, the output being connected to an analog filter 322. The output of the analog filter 322 provides a signal that is eventually coupled to or is transmitted on the line 202.

The scrambler 304 manipulates received signals to generate a generally random bit sequence in an attempt to output a data stream without long sequences of constant voltage or repeated patterns. Long consecutive bit sequences can cause wide variations in the received power level as well as difficulties for adaptive equalization and clock recovery. In one embodiment the scrambler is embodied using a shift register with feedback connections. A de-scrambler, assumed to be located in the receiver, may comprise a shift register with feed-forward connections. In one embodiment the scrambler is embodied to generate periodic sequences. The signals generated in this case are particularly well suited for wake-up signals. The operation of the scrambler 304 in relation to the invention is described below in detail.

The signal mapper 308 transforms the digital output of the scrambler to the various signal levels that represent each of the bit values. For example, four bits of digital data may be represented as 16 PAM, i.e. any of 16 different numerical values. The 16 different values may be represented on a scale of minus one to one in increments of ⅛. The signal is ultimately scaled by an amplifier to yield a desired transmit power. In one embodiment the signal mapper 308 comprises a table lookup device or process that translates the binary input to numeric output.

The transmit filter 312 is configured to manipulate the output data to adhere to desired or required spectral requirements. For example, frequency filtering may occur to improve system performance by tailoring the frequency content of the output or it may simply be mandated by FCC or a standards organization. It may be desired to attenuate out-of-band energy while also minimally effecting in-band energy. The embodiment shown in FIG. 3 implements spectral shaping with a digital filter. The analog filter serves to reject images of the digital processing. Another embodiment eliminates the digital transmit filter. In this case, the spectral shaping is provided by the analog filter.

The digital to analog converter 316 is generally understood to convert a digital signal to an analog signal. In the embodiment shown in FIG. 3, the transmission on the line occurs in an analog format.

The analog filter 322 performs final filtering of the analog waveform to spectrally prepare the signal for transmission over the line 202. The analog filter 322 may operate similarly to the transmit filter 312 but in the analog domain.

In one embodiment of the scrambler 304, the scrambler is configured to generate periodic sequences having good autocorrelation properties. One example of a signal with good autocorrelation properties is a signal that can be made to closely approximate an impulse. As can be understood, an impulse is a signal that, within a very short interval of time, assumes a substantially non-zero value while being approximately zero outside this time interval. An impulse response characterizing the line/channel is one desirable outcome of channel analysis or for detection. It is contemplated that a device other than a scrambler may be configured to generate the periodic sequences used for line probing. Any device or configuration of hardware and/or software may be adopted for use for generating sequence signals without departing from the scope of the invention.

Figure 4:
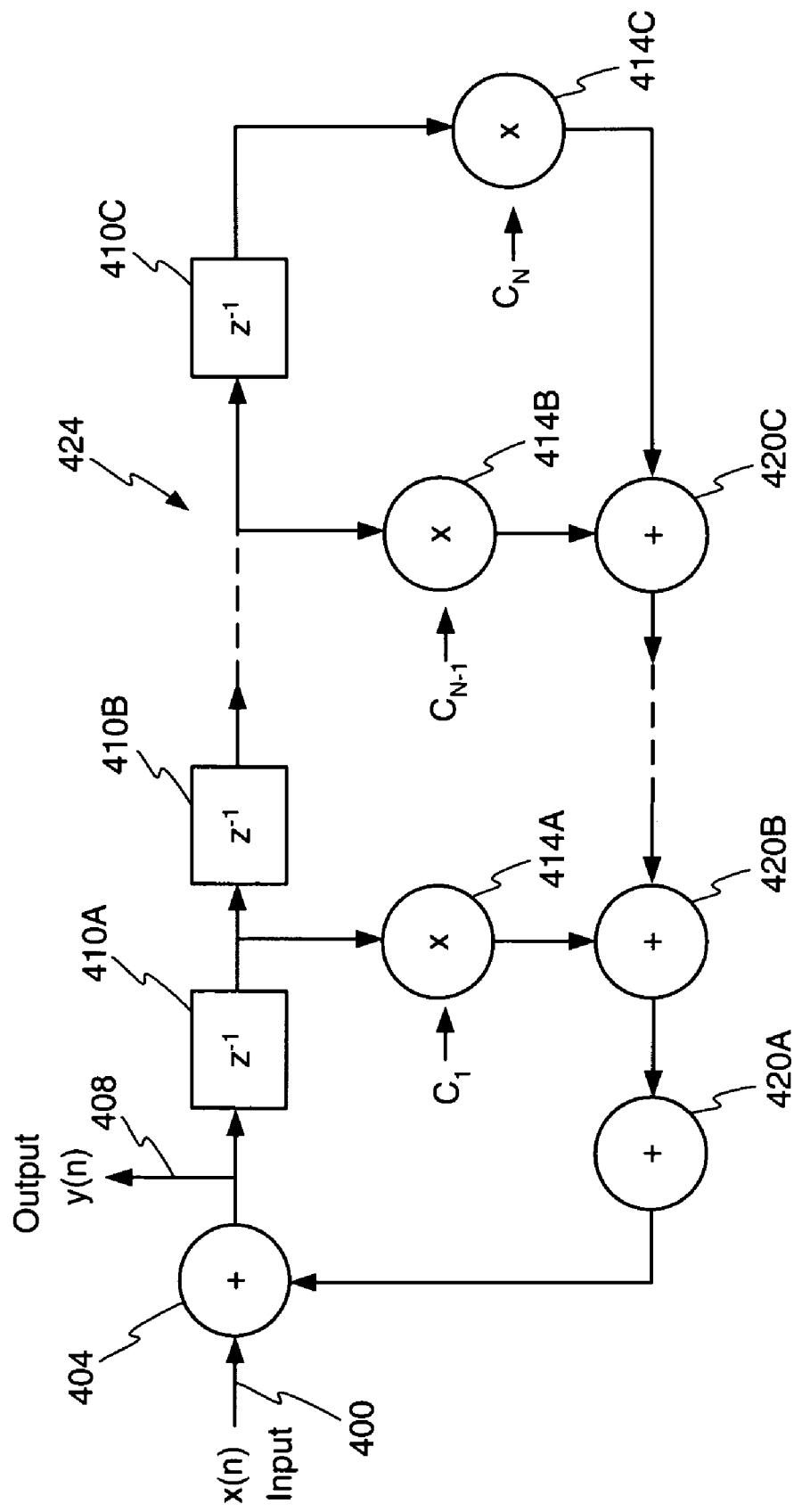
FIG. 4 illustrates a block diagram of an example embodiment of a sequence generator configured using a linear feedback shift register or scrambler type implementation.

FIG. 4 illustrates a block diagram of an example embodiment of a sequence generator configured using a linear feedback shift register or scrambler type implementation. An input 400 connects to a summing unit 404. All arithmetic operations may be performed in a modulo-2 fashion. The summing unit 404 has an output connected to an output line 408 and a delay register 410A. The output of the delay register 410A connects to a multiplier 414A, having a multiplier set to $C_1$, and to another delay register 410B. The output of delay register 410B connects to N number of other delay registers and multipliers until connecting to a delay register 410C and to a multiplier $C_{N-1}$. The output of delay register 410C connects to a multiplier 414C that has a multiplier $C_N$. This creates an Nth order generator due to the N memory elements or delay registers 410. This thus generates an output based on the content of the registers, also known as the state of the scrambler. Thus, the total number of different possible states of the generator is $2^N$.

In one example method of operation, a continuous sequence of logic value 1's is provided to the input 400. The state of each register may be selectively loaded with a logical one or a logical zero based on the desired sequence to be generated. When provided with a string of logics one values, the generator outputs a unique string, or sequence, of 1's or 0's based on the values of the registers 410. In one embodiment, the values loaded into the registers are selected to form a primitive polynomial known to generate a maximal length sequence (M-sequence). The sequence will repeat through the $2^N-1$ non-zero states.

Figure 5:
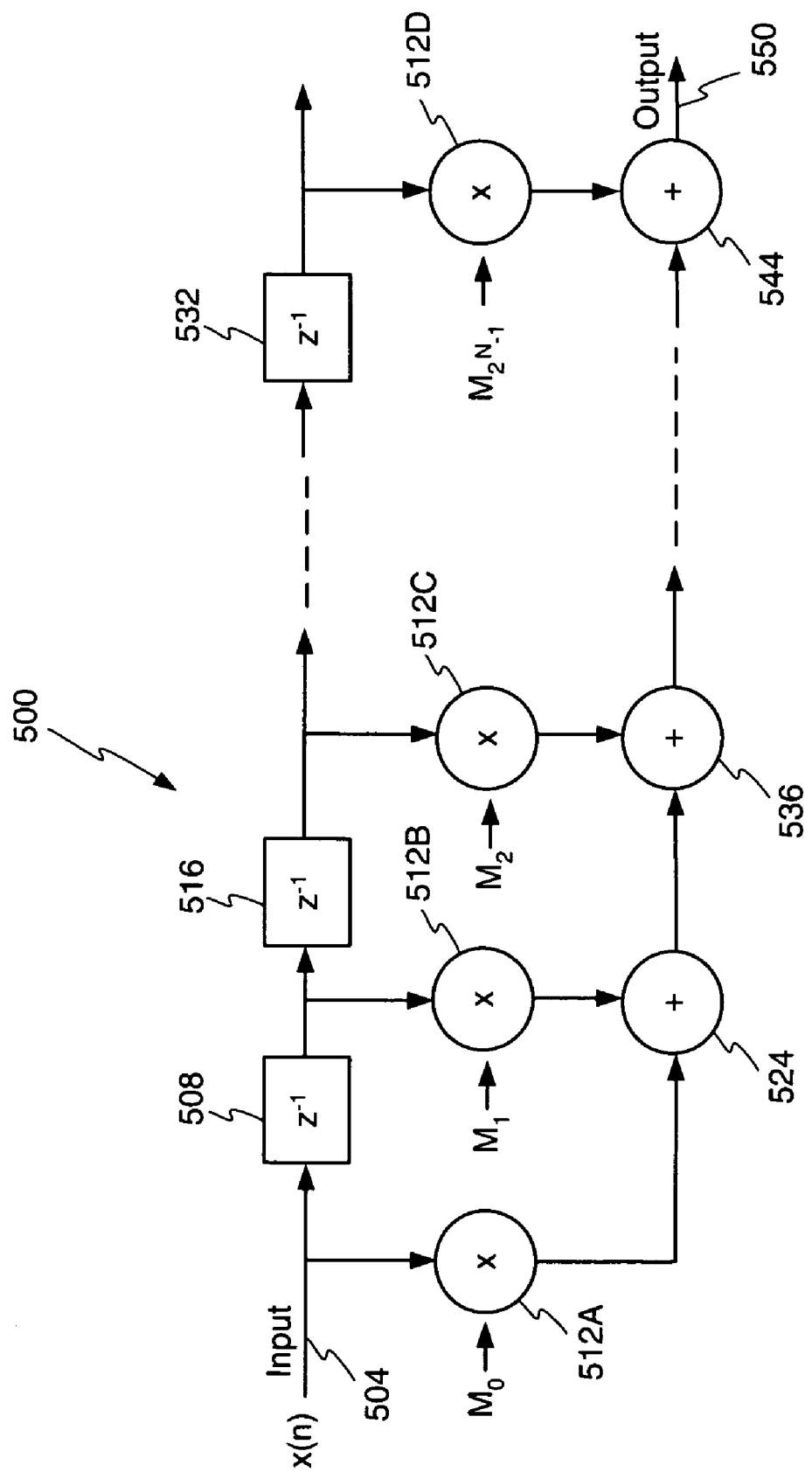
FIG. 5 illustrates an alternative embodiment of a sequence generator.

FIG. 5 illustrates an alternative embodiment of a sequence generator. The embodiment shown in FIG. 5 comprises a tapped delay line configuration designed to generate a sequence for use with the systems described herein. As shown in FIG. 5, an input 504 connects to a delay register 508 that is configured to receive and delay for a clock cycle or other period the received value. The input 504 also connects to a multiplier 512A having a multiplier value $M_0$. All arithmetic operations in this embodiment may be performed in the traditional fashion, that is, not modulo-2. The output of the multiplier 512A connects to a summing junction 524.

The output of the register 508 connects to multiplier 512B having a multiplier value $M_1$. The output of the multiplier 512B connects to the summing junction 524 to add the output of the multiplier 512B and the multiplier 512A. The output of the register 508 also connects to a register 516, the output of which connects to multiplier 512C. The output of the multiplier 512C connects to summing junction 536, which also receives the output of summing junction 524. The tap delayed line 500 continues in this configuration until connecting to a register 532 that has an output connected to a multiplier 512D with a multiplier factor $M_{2^N-1}$. The output of multiplier 512D connects to a summing junction 544 that also receives the output of the previous summing junction.

This configuration is $2^N-1$ long with the elements of the tapped delay line controlling the sequence generated. Specifically, the coefficients of the tapped delay line are the sample values of the desired sequence signal. An input of a pulse followed by zero-valued samples to the tapped delay line propagates through the tapped delay line and as the pulse propagates through the line, it encounters the multiplier values of the multipliers 512. The multiplier value will propagate to the output since all other coefficients are multiplied by zeros. In one embodiment, the multiplier values may comprise a logical 1 or a logical 0. The multipliers 512 each pass a logical 1 to its associated summing junction or pass a logical 0 to its associated summing junction. Hence, a sequence signal is output with values controlled by the values of the multipliers 512. In a variation of this embodiment, the values of the multipliers may be selected as other than 1's or 0's to thereby generate a mapping as is performed by the mapping module 222 shown in FIG. 2. In such a variation, the mapping module 222 can be eliminated.

Yet another embodiment of the sequence generator comprises a table look-up system. In a table look-up system, a sequence signal is stored in memory or a look-up table and recalled using a software interface. Hence, upon request of a particular sequence signal, the sequence generator 220 performs a table look-up, recalls the desired sequence signal from memory, and provides the sequence to the other systems of the transmit module 200. Any number or variation of sequence signals may be stored or retrieved.

Figure 6A:
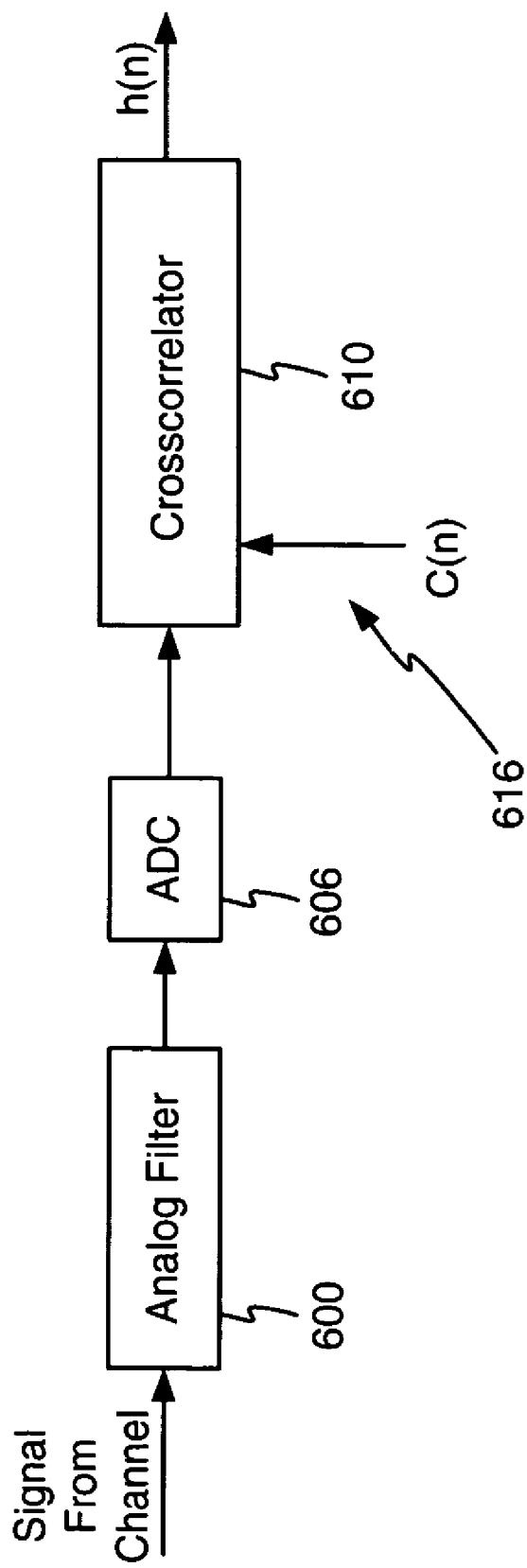
FIG. 6A illustrates a block diagram of an example embodiment of a receiver.

FIG. 6A illustrates a block diagram of an example embodiment of a receiver. As is understood by those of ordinary skill in the art, various components have been left out so as to not obscure the relevant aspects of the invention. As shown, the receiver includes an analog filter 600 connected to an analog to digital converter 606. The output of the analog to digital converter 606 connects to a crosscorrelator 610. As stated above, mathematically, the crosscorrelator is realizing the following function:

$$h(n) = \sum_k C(k)X(k+n)$$

where X(n) is the sum of the transmitted line probe sequence C(n) plus any additive noise and crosstalk. There are numerous ways to implement the crosscorrelator 610 and this is but one example embodiment. The correlator 610 may be embodied in hardware, or software, or a combination of the two. Indeed, it is contemplated that an analog implementation of the crosscorrelator maybe preferred particularly in high rate applications. The crosscorrelator 610 receives a signal C(n) 616. The output of the crosscorrelator 610 comprises a signal h(n).

The analog filter 600 performs filtering of the signal in the analog domain to filter out unwanted noise on the received signal that is outside of the desired frequency band and to provide only desired frequency components to the other aspects of the receiver. The analog to digital converter 606 converts the analog signal to the digital format.

The crosscorrelator 610 processes the signal C(n) and the received signal over the period of the sequence to obtain an estimate of the impulse response of the channel. This may later be transformed into the frequency domain to be used in the SNR calculation. The signal C(n) comprises a receiver generated copy of the sequence that was sent out over the line as the wake-up sequence. The received sequence and the signal C(n) are correlated together to generate a signal generally equivalent to a signal generated by sending an impulse through the channel. This is a time domain signal that may be transformed to the frequency domain, for example with a Discrete Fourier Transform (DFT), to obtain the power spectral density. In one embodiment, a fast Fourier Transform (FFT) is performed to obtain the power spectral density. Thus a wake-up signal may be detected and used for channel analysis.

One example method of cross correlation is achieved with the use of a sliding tap delay line. The sliding tap delay line may comprise a finite impulse response digital filter having a length equal to a multiple of the period of the sequence. The multiple may depend on whether over-sampling occurs in the receiver. The coefficients or taps in the finite impulse response filter may correspond to the bit values in one period of the sequence. In one particular embodiment the sliding tap delay has 63 taps. Any number of taps may be adopted for use.

Figure 6B:
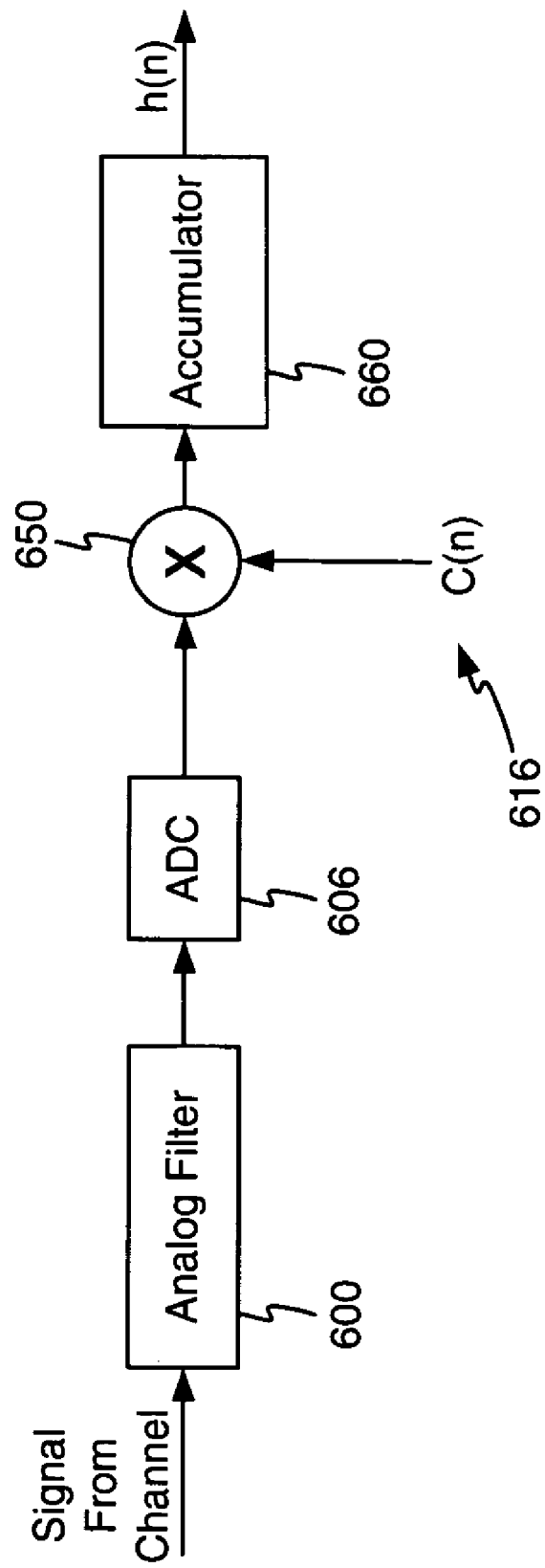
FIG. 6B illustrates a block diagram of an alternative embodiment of a receiver.

In the embodiment shown in FIG. 6B, the receiver is embodied with a configuration to approximate an integration of the received signal multiplied by the sequence signal C(n). The output of the analog filter 600 feeds into an analog to digital converter 606. The output of the analog to digital converter 606 connects to a multiplier 650. The multiplier 650 receives, as another input, the signal C(n) 616. The multiplier 650 multiplies the received sequence with the signal C(n) 616 to generate an output that is provided to an accumulator 660. The accumulator 660 comprises a device configured to generate a running summation of the received signals. In general, the output of the accumulator 660 is generally similar to a first order approximation to an integral over the period of time that the accumulator operates. Thus, the accumulator 660, upon receipt of a number, stores the number. Then, upon receipt of another number, the accumulator 660 adds the first number to the second number and stores the result. The process continues in this manner. In one embodiment the accumulator comprises a summing operation and a register to store the accumulating result.

The output of the cross correlation process is an estimate of the impulse response. This is a time domain signal. Transforming the output into the frequency domain provides the transfer function. There are a number of ways to transform the signal into the frequency domain, one being a DFT, another being an FFT. The output of the cross correlation comprises an estimate of the impulse response or channel response. Transforming this signal into the frequency domain yields the frequency spectrum, including all channel effects, of the sequence signal transmitted over the line.

Figure 7:
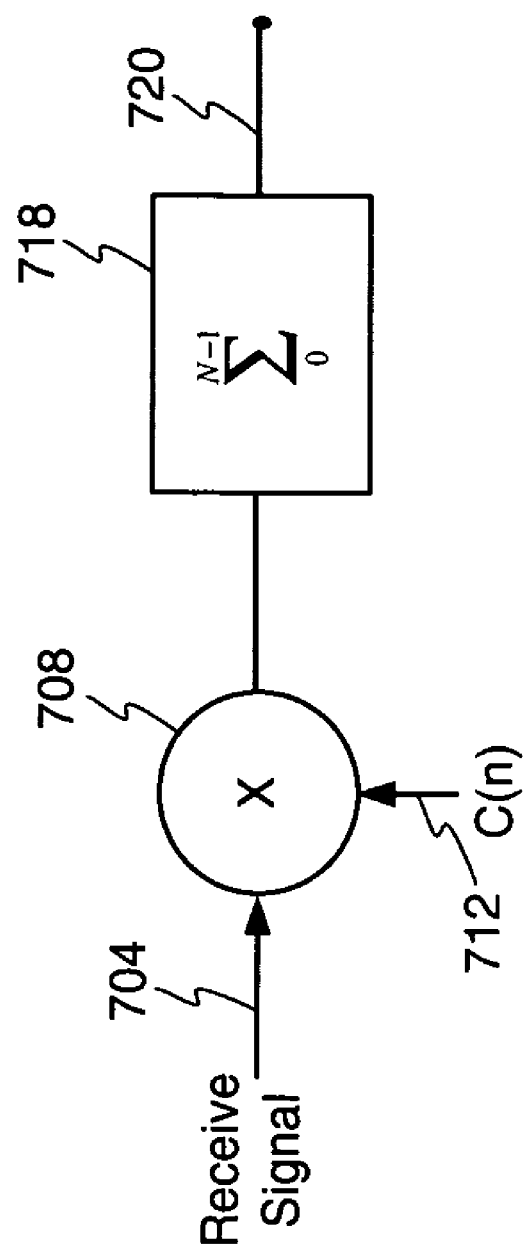
FIG. 7 illustrates block diagram of a correlation unit configured to correlate a received signal with a signal C(n).

One example embodiment of a cross correlation device is shown in FIG. 7. FIG. 7 illustrates block diagram of a correlation unit configured to correlate a received signal with a signal C(n). An input 704 connects to a multiplier 708. A second input 712 provides a second signal to the multiplier 708. The output of the correlator connects to a summing junction 718, which has an output 720.

The received sequence signal is provided on input 704 to the multiplier unit 708 while a sequence signal C(n), that is generally identical to the sequence signal transmitted on the channel, is provided on the second input 712. These sequence signals are multiplied together on a value by value basis over time. The output of the multiplier 708 is summed, over time, in the summing junction 718 and provided on the output 720. The correlation system provides an output signal with a peak at the point when the signals align, i.e. correlate. A noticeable peak at the point of correlation indicates a sequence with good correlation properties. One or more such points of correlation may indicate that the signal is a wake-up signal.

The accumulator or summing junction 718 comprises a device configured to generate a running summation of the received signals. In general, the output of the summing junction 718 is generally similar to a first order approximation of an integral over the period of time that the system operates. Thus, the summing junction 718, upon receipt of a number, stores the number. Then, upon receipt of another number, the summing junction 718 adds the first number to the second number and stores the result. The process continues in this manner. In one embodiment, the summing junction 718 comprises one or more registers to store the accumulating result. The output of the correlation process is an estimate of the impulse response of the channel. This is a time domain signal.

Another example embodiment of the cross correlation is based on frequency domain processing. The cross correlation can be implemented in the frequency domain by multiplying together the frequency domain representation of the received signal and the reference signal. The reference signal may be the discrete Fourier transform (DFT) of the transmit sequence. When periodic sequences are used, the frequency domain representation can be constructed by using a DFT of the same length as the period of the signal. If the receive signal consists of multiple periods, then the noise characteristics of the correlated signal can be improved by appropriately summing up multiple periods, either before or after taking the DFT of the received signal. For non-periodic signals or signals with long periods, it may be appropriate to compute the cross correlation in the frequency domain using the overlap-add or overlap-save methods. If the cross correlation is computed in the frequency domain, it may be appropriate to convert it back to the time domain for further time domain processing.

Figure 8A:
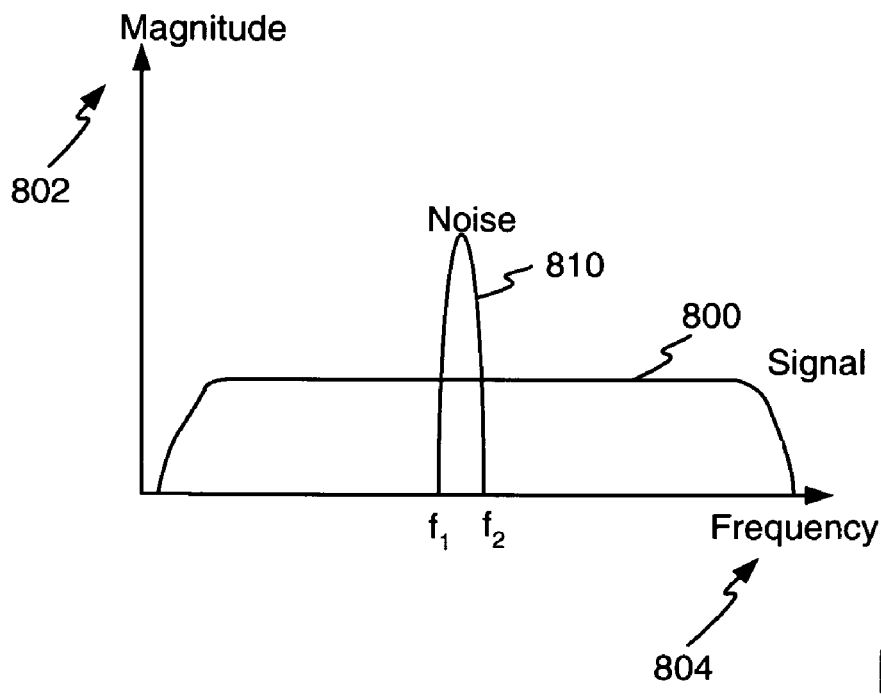
FIGS. 8A and 8B illustrate example plots of a sequence signal and the effect of correlation with regard to noise.
Figure 8B:
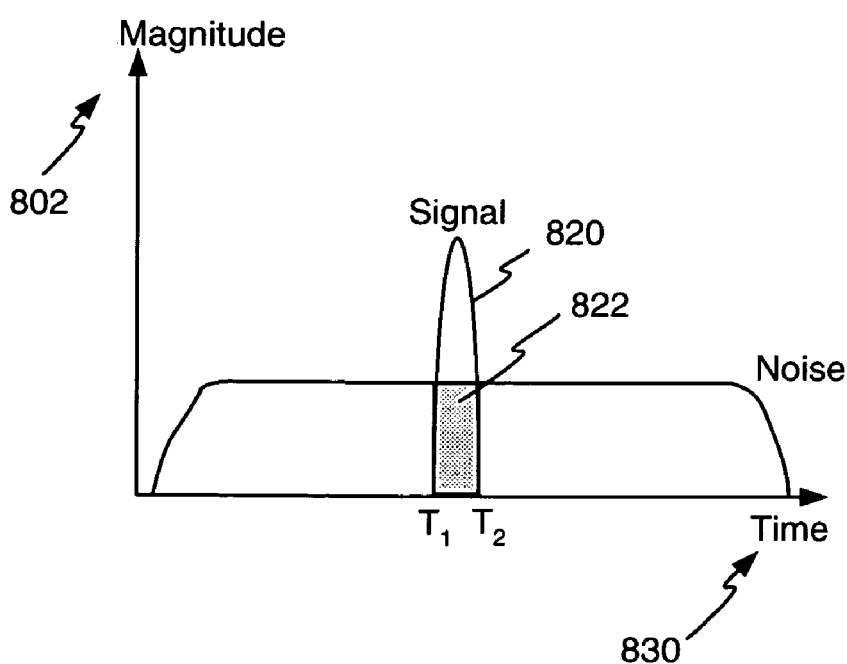

FIGS. 8A and 8B, which illustrates example plots of a sequence signal and the effect of correlation, are helpful in describing the advantages gained by the invention with regard to noise. FIG. 8A illustrates a plot of a sequence signal 800 in relation to a vertical axis 802 representing magnitude and a horizontal axis 804 representing frequency. An undesirable noise component 810 resides between frequencies $f_1$ and $f_2$. If a single pulse signal is transmitted, the noise that will be received with the signal will disrupt analysis or detection, especially if the noise resides at a frequency that coincides with the frequency of the pulse.

In reference to FIG. 8B showing a plot of the correlated signal 820 and the noise 822 that is part of the correlated signal after correlation in relation to magnitude on the vertical axis 802 and time on the horizontal axis 830. During the correlation process, the original sequence and the received sequence only correlate at the point of alignment, that is between times $T_1$ and $T_2$. Thus, noise on the reflection signal is disbursed over the time period of the correlation process. Correlation serves as a summation only at the point of correlation thereby reducing the effects of the noise. Hence, noise is a smaller portion 822 of the correlated signal because the noise is spread. Thus, the invention reduces the effect of noise on the line.

Another advantage of sequence signal is that it allows for the transmission of a lower power signal over the channel. Use of a low power signal eliminates interference, such as from crosstalk, with other adjacent lines, such as other pairs in the binder. Use of a low power signal provides the further advantage of enablement using an integrated circuit, such as built into a modem, which reduces overall power usage.

It is contemplated that the power level of the sequence may be of any magnitude. In one embodiment the power level may be constrained by applicable standards such as the ITU G.shdsl or ANSI HDSL2 standards. This may be implemented by use of transmit filtering which conforms to the power spectral density constraints imposed by those standards. Since the sequence signal may be a valid data signal, it may conform to the standard specifications if the same transmit filtering is employed. This is not true in general for single pulse systems, which may use an undesirable high power pulse as the signal wake-up signal.

In one embodiment the peak voltage of the sequence signal is less than 6 volts. In another embodiment, the peak voltage of the sequence signal is between 6 volts and 18 volts. In yet another embodiment, the peak voltage of the sequence signal is higher than 18 volts. This are but example ranges. Any peak voltage or power level may be selected.

Figure 9:
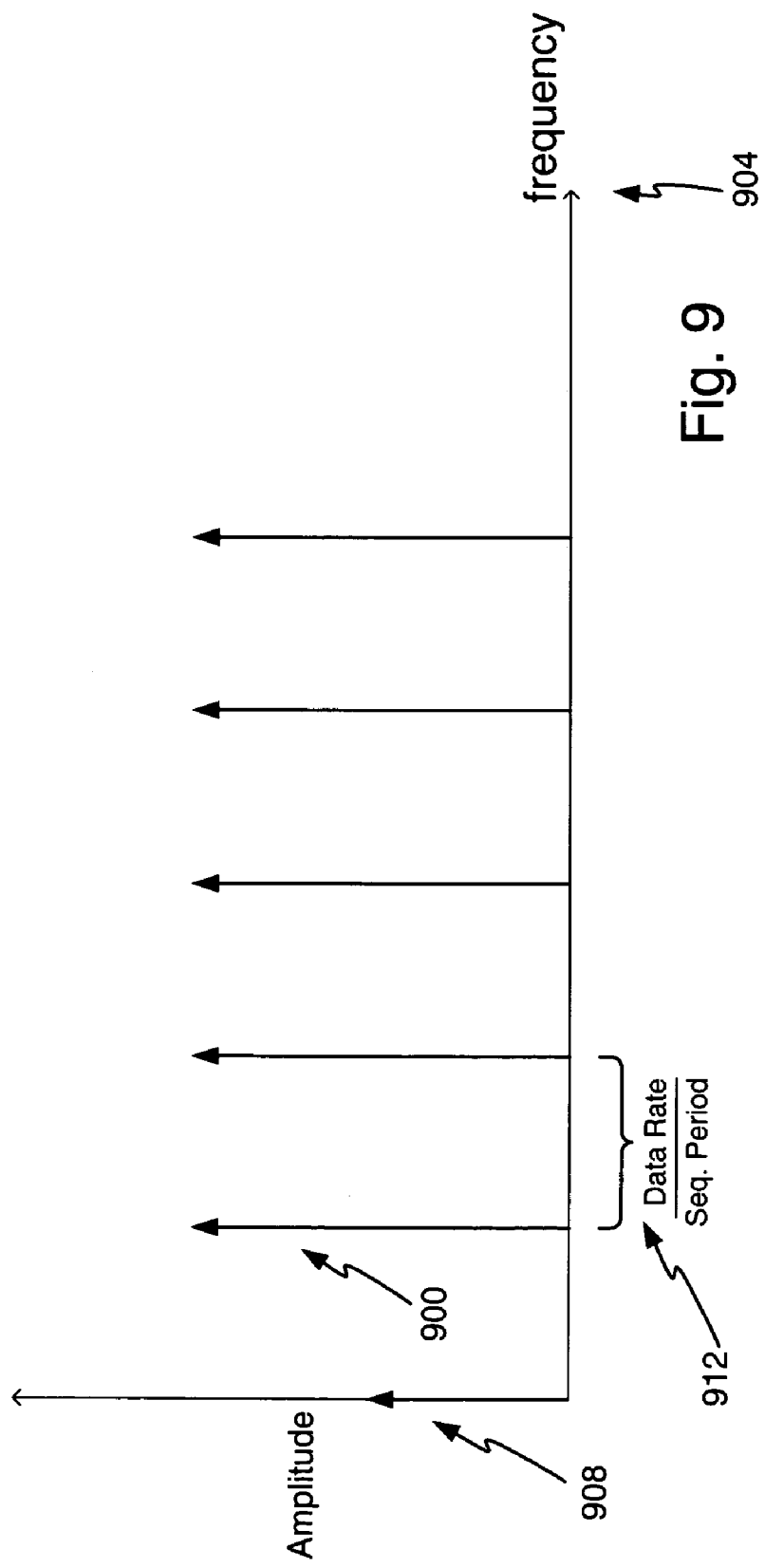
FIG. 9 illustrates a plot of frequency components of a periodic sequence on a graph of frequency and spectral amplitude.

FIG. 9 illustrates a plot of frequency components 900 of a periodic sequence on a graph of frequency 904 and spectral amplitude 908. The frequency domain sequence 900 hence appears as an impulse signal having period 912 of the symbol rate divided by sequence period. This representation can be arrived at by performing the Fourier transform (FT) on the sequence signal. This representation of the sequence can be processed by tone detecting receivers. This capability is desirable to maintain backwards capability with other systems that operated as tone based systems. For example, in one embodiment, tones at 12 Khz and/or 20 Khz may be used to designate a wake-up request to maintain capability.

In one configuration, the scrambler or other device with similar capabilities generates a sequence defined by varying the polynomial of the sequence generator to provide different wakeup signals signals. In another configuration the polynomial is selected to maximize the period of the sequence, such as to create an M-sequence. As described above, the period of a length maximized sequence is defined as $2^m-1$ where m is the number of stages of the shift registers used to generate the sequence.

By varying the number of stages m, the period is controlled. Various advantages may be gained by varying the period of the sequence. For example, one advantage of increasing the period of the sequence when used according to the invention for activation is a spreading of the noise, represented in FIG. 2 by N(t), over the period of the sequence. Spreading the noise reduces the effect of the noise components that become part of the warm start signal during transmission of the warm start signal through the line. This improves the performance of the activation. When the wakeup signal is used for channel estimation, increasing the period of the sequence enables probing based on more probing tones with finer frequency spacing. Another advantage of increasing the period of the sequence is that the line probing can provide longer impulse responses.

An advantage of a shorter period generated by using a smaller m value is that the sequence may be generated and analyzed more rapidly. This speeds the line probe process. Another advantage of shorter period sequences is a lowering of the computational complexity in the receiver.

Figure 10:
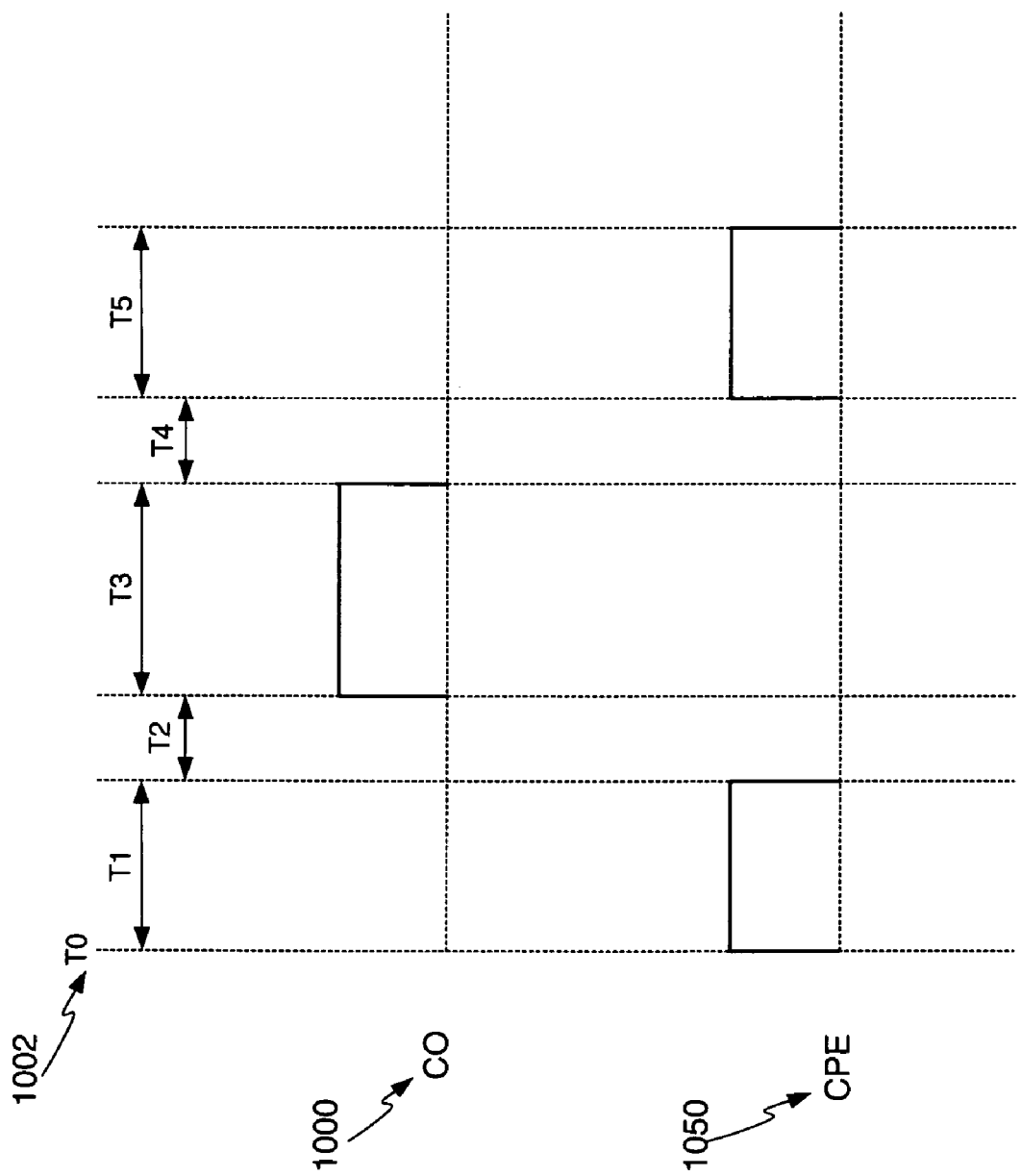
FIG. 10 illustrates an exemplary timing diagram of an example pattern of wake-up signal communication between a central office communication device and customer premise equipment.

FIG. 10 illustrates an exemplary timing diagram of an example pattern of communication between a central office (CO) communication device 1000 and a customer premise equipment (CPE) 1050. At a time at and up to T0 the CO and CPE are in a powered down or reduced power state. This reduces power usage. Thereafter, at a time period T1, the CPE transmits a wake-up sequence signal. As discussed above, utilizing a sequence signal as a warm-start signal has advantages over the prior art. Thereafter, during a time T2, the CO receives the signal and processes the signal. If the sequence signal sent during period T1 is determined to be a warm-start request signal, then during a time period T3, the CO transmits a response signal or acknowledgement to the CPE. Accordingly, during a time period T4, the CPE processes the response or acknowledgement signal. If the proper response is received, then during a time period T5, the warm start process may initiate. This is but one possible time sequence for a warm start signal operation. The durations of each time period are provided for purposes of example only and not intended to reflect the actual time frames of the wake-up signal and/or optional response signal during time period T3.

Figure 11:
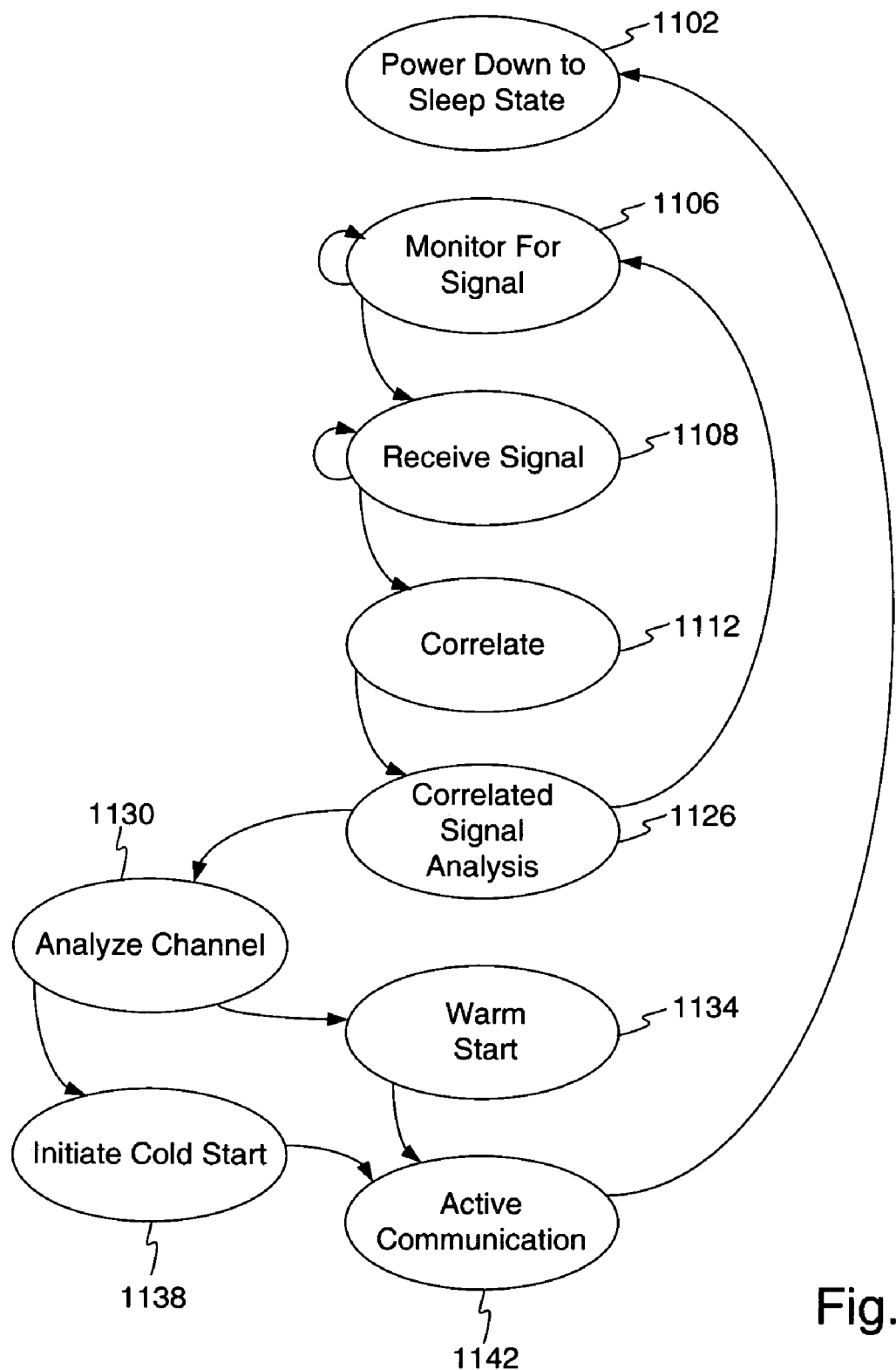
FIG. 11 illustrates a state diagram for an example sequence of wake-up for a communication system.

FIG. 11 illustrates a state diagram for an example sequence of wake-up for a communication system. This is but one example pattern of states which the wake-up system may assume. At a state 1102 the communication devices initiate a power-down process after a period of inactivity. From state 1002 the system may progress to a state 1106 and monitor for a sequence signal that indicates a desire for one or more of the communication systems to wake-up. At state 1106, the monitoring may continue, or the operation may progress to a state 1108 to receive an incoming signal. Any type signal may be received. In one embodiment only a sequence signal having predetermine characteristics will trigger a system activation via a warm start. After receiving the signal at state 1108, the system moves to state 1112 wherein the received signal is correlated. After state 1112 the system moves to a state of operation comprising signal analysis at a state 1126. In one embodiment the signal analysis comprises comparison of the correlated signal to a known signal having known characteristics. Based on this comparison, a determination can be made whether the received signal was a request for a warm start procedure. Any of one or more communication devices may initiate the processes by transmitting a wake-up signal.

From state 1126 the system may assume state 1130 or return to state 1106 to continue monitoring for a signal. State 1106 occurs if the signal, after analysis, does not qualify as a signal requesting warm start. State 1130 comprises a channel analysis state wherein the change in the channel may be determined based on comparison of current channel parameters to prior channel parameters. Current channel parameters may be determined via the analysis during state 1126. From state 1130, the operation may assume a state 1134 or a state 1138. At state 1134, a warm start operation is initiated. This state is reached if the analysis at state 1126 reveals that the received signal was a wake-up signal and the channel comparison at state 1130 determines that the channel parameters had not changed so significantly so that a warm start procedure could not be performed.

Alternatively, state 1138 may be initiated such that a cold start process occurs. If the channel parameters change significantly, then a warm start process may not be able to occur. Thus a cold start process is initiated. After either of the warm start process of state 1134 or the cold start process of state 1138, the system progresses to a state 1142 where active communication occurs between two or more communication devices. If during active communication a sufficient period of inactivity occurs, then the system may initiate a power down state, to save power and reduce noise and heat generation, by returning to a state 1102.

Figure 12:
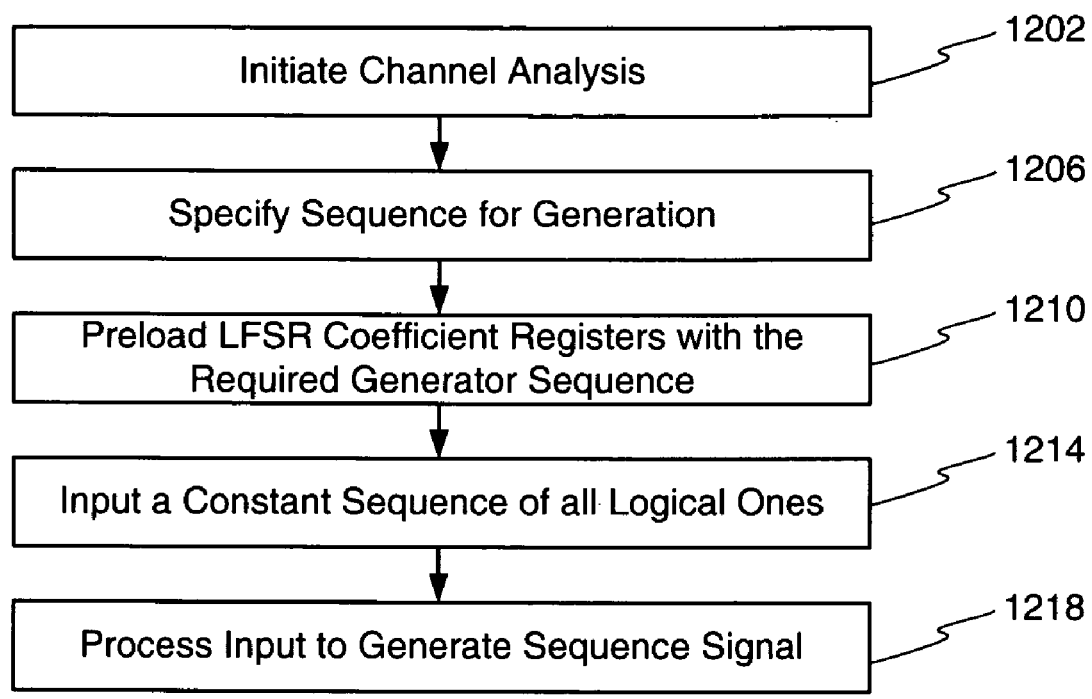
FIG. 12 illustrates an operational flow diagram of an example method of sequence generation.

FIG. 12 illustrates an example method of sequence generation. To aid in understanding, FIG. 12 is divided between a transmitter side on the left and a receiver side on the right. As can be understood, steps are simultaneously being undertaken at both the receiver and the transmitter. Numerous different methods of sequence generation are possible. The embodiment shown in FIG. 12 comprises generation by use of a linear feedback shift register (LFSR). At a step 1202, the wake-up operation initiates the signal generation process. Next, at step 1206, a specific sequence is designated for use. One characteristic of a specified sequence is its period. At step 1210, the operation preloads registers of the linear feedback shift register with values necessary to realize the specified sequence. At a step 1214, the operation begins inputting a constant sequence of logical 1's into the sequence generator. Thereafter, at a step 1218, the operation processes the series of logical 1's through the sequence generator to create the specified sequence signal.

Figure 13:
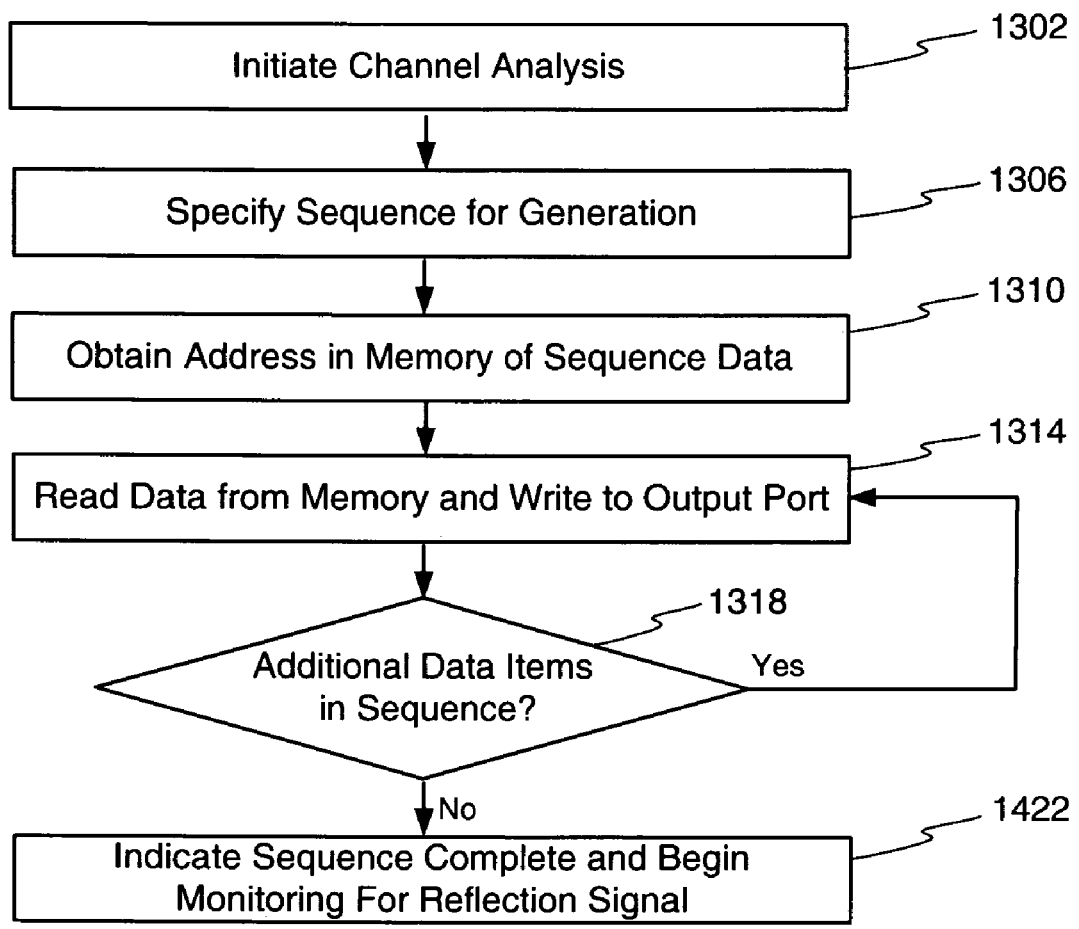
FIG. 13 illustrates an operational flow diagram of an alternative method of sequence generation such as might be implemented for use with a table look-up method.

FIG. 13 illustrates an alternative method of sequence generation such as might be implemented for use with a table look-up method. At a step 1302, the sequence signal generation process is initiated. Thereafter at a step 1306, the operation specifies a sequence for generation. Once the desired sequence is specified at a step 1310, the system obtains or is provided a memory address for the sequence data. Once the location in memory or the look-up table is provided or obtained, the system begins outputting the data items of the sequence. This occurs at step 1314. The operation then progresses to a step 1318 where the system queries to determine if there are additional data items remaining in the sequence. If additional data items exist, then the operation returns to step 1314 and an additional data item is output. If at step 1318 there are no more additional data items in the sequence to be output, then the operation progresses to a step 1322 to indicate that the sequence is complete.

It should be noted that in the methods of FIGS. 12 and 13, the sequence may be generated and transmitted once, generated numerous times and sequentially transmitted numerous times, or generated or transmitted in some pattern with a period of silence between one or more sequence transmissions.

Figure 14A:
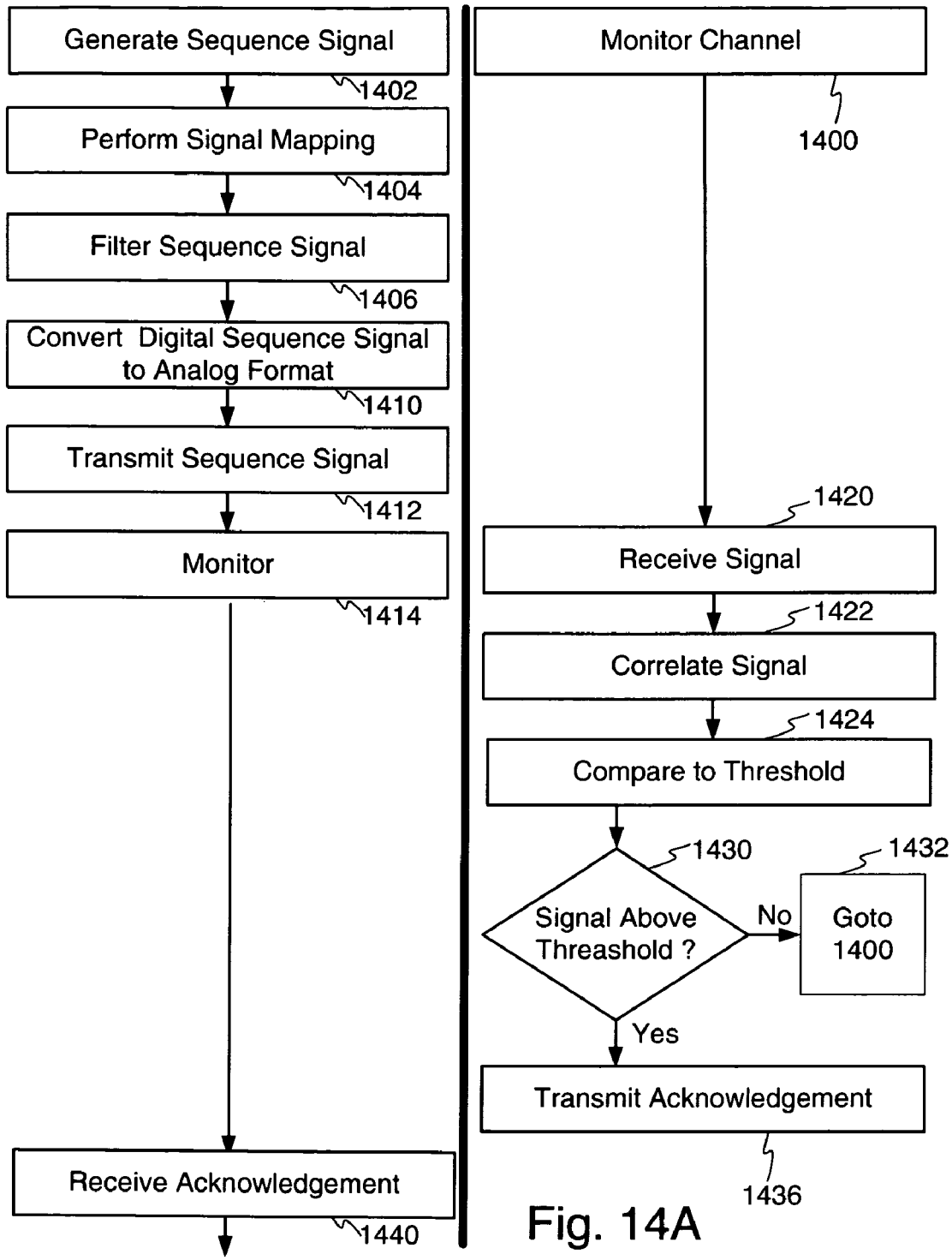
FIG. 14 illustrates an operational flow diagram of an example method of operation of one embodiment of the invention.

FIG. 14 illustrates an example method of operation of one embodiment of the invention. This is but one example embodiment. It is contemplated that other methods of operation are possible and within the scope of the invention as define by the claims. At a step 1402, the wake-up system (hereinafter system) generates a sequence signal. The sequence signal may comprise an M-sequence or any other type of sequence. In one embodiment, the sequence comprises a sequence with good autocorrelation properties. At a step 1404, the operation performs signal mapping to assign the sequence signal to one of several different values. At a step 1406, the system filters the signal to remove unwanted components. At a step 1410, the system converts the digital sequence signal to an analog format. At a step 1412, the system transmits the sequence signal over a communication channel.

At a step 1414 the system monitors for a response from the remotely located communication device on the far end of the channel or line. This monitoring is in anticipation of a response from the communication device that is receiving the sequence signal generated at step 1406.

At a step 1420 the receiver receives the sequence signal. Of course, at this point the receiver does not know if it is a sequence signal, or simply noise on the line. Accordingly, at step 1422, the receiver correlates the received signal. As a result of the correlation, a correlated signal is created. This correlated signal is compared, at a step 1424, to a reference signal or reference data regarding a known correlated signal representing a wake-up or activation sequence signal. By way of example, the correlated signal will have peaks or signal characteristics. These signal characteristics are compared to the threshold signal to determine if a wake-up signal has been received. If at decision step 1430 the correlated signal is not above the threshold then the operation progresses to a step 1432 wherein the operation returns to step 1400. Hence, by jumping to step 1400 the operation has determined that the correlated signal received over the channel is not a wake-up signal or does not qualify as a wake-up signal.

If at step 1430 the correlated signal is above the threshold or sufficiently matches the threshold signal, then the operation progresses to step 1436 wherein the device that began as a receiver of the wake-up signal now acts as a transmitter by generating and transmitting an acknowledgement signal, which may be in the form of a sequence signal, to the device that originally acted as the transmitter.

Figure 14B:
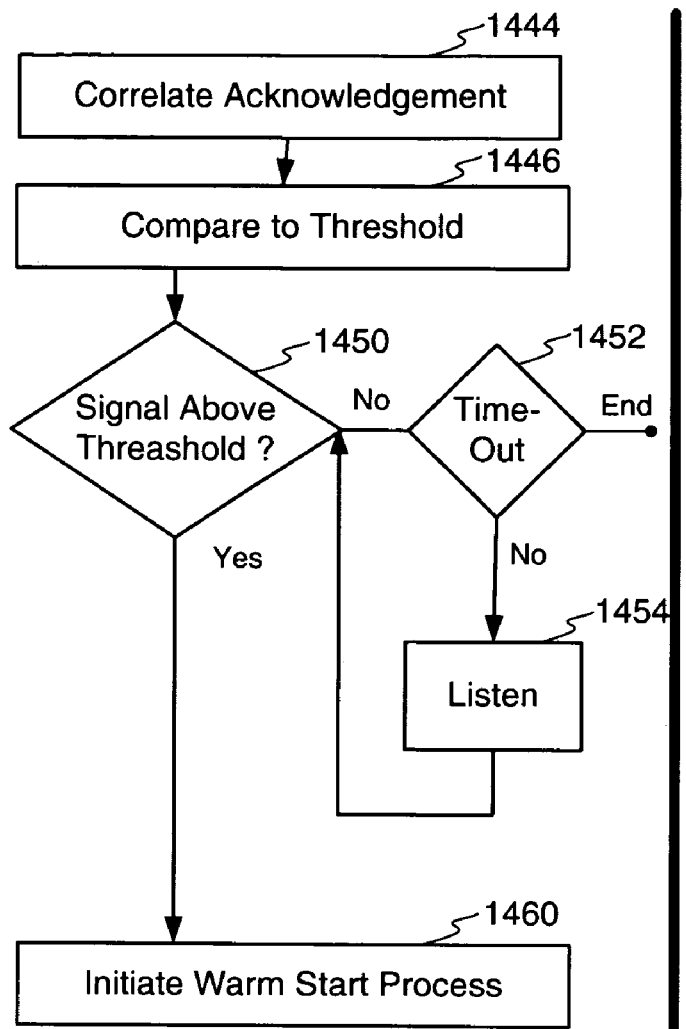

Returning to the transmitter (left) side of FIG. 14 at a step 1440, the device that originally transmitted the signal receives the acknowledgement signal. Turning to FIG. 14B, at a step 1444, the acknowledgement signal is correlated. Thereafter, the correlated acknowledgement signal is compared to another threshold signal. The threshold signal may be the same as the prior threshold or a different threshold. It is contemplated that the threshold may be dependent upon the sequence signal that is transmitted as the wake-up signal and/or the acknowledgement signal.

At decision step 1450, a determination is made whether the acknowledgement signal is above or sufficiently close to the threshold to qualify as an acknowledgement signal. If it is not above or sufficiently close to the threshold, then the operation progresses to a step 1452. At step 1452, there is a time-out decision block. If a time period for acknowledgement passes, i.e. times-out, then the operation ends and it is assumed no wake-up will occur because no acknowledgement signal was receive. In contrast, if at step 1452 the time-out time has not expired, then the operation progresses to a step 1452 and the process listens or waits for an acknowledgement signal. This process continues between step 1452 and step 1454 until the time-out period expires.

If at step 1450 the acknowledgement signal is at or above the threshold, then the operation progresses to a step 1460 wherein the warm start process is initiated. Other actions may be taken other than a warm start operation if a wake-up signal is detected. Moreover, it is contemplated that a warm start process may occur which needs an acknowledgement signal process.

Figure 15:
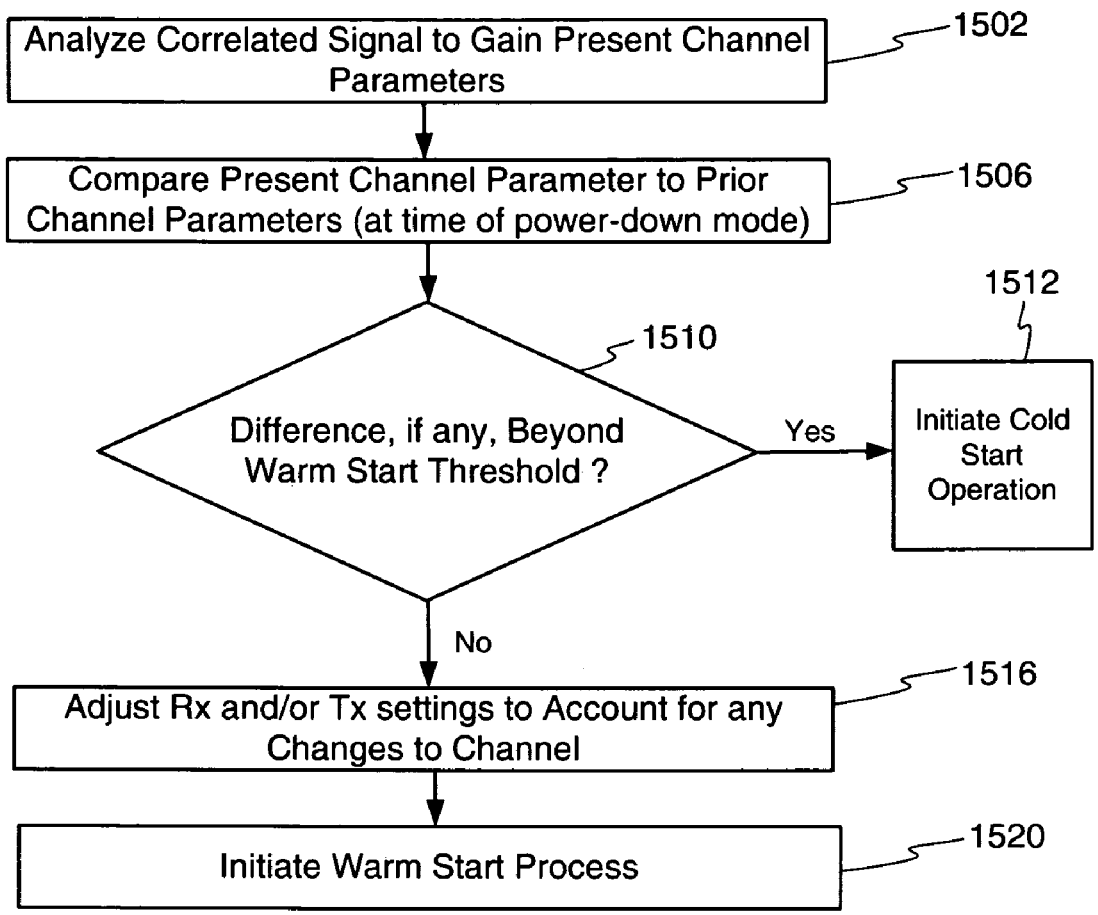
FIG. 15 illustrates an operational flow diagram of an alternative method of operation implementing channel analysis as part of the wake-up signal process.

FIG. 15 illustrates an operational flow diagram of an alternative method of operation. In the method described in FIG. 15, channel analysis is performed in conjunction with the receipt of the wake-up signal used to initiate operation. Thus, upon receipt and detection of the wake-up signal, analysis is performed to ready the communication device or devices for operation. For purposes of understanding, only the steps in addition to the warm-start signal detection process described in FIG. 14 are shown in FIG. 15. The analysis discussed in conjunction with FIG. 15 may be performed at any time after receipt of the sequence signal. In addition, this is but one possible and exemplary method of operation. Other methods that do not depart from the concepts described herein are contemplated. At a step 1502 the operation analyzes the correlated signal to obtain present or current channel parameters. Channel parameters comprise information regarding the effect the channel has on a signal as the signal passes through the channel. The channel parameters may comprises, but are not limited to received signal power, received signal power spectral density, channel impulse response, channel transfer function, received noise power, received noise power spectral density. After analysis, the operation progresses to a step 1506 and the present channel parameters, determined in step 1502 are compared to the prior channel parameters as existed at the time of entry into sleep mode or power-down mode.

At a decision step 1510 if the difference in channel parameters is greater than the change allowed for a warm start operation, then the process progresses to a step 1512 wherein a cold start operation is initiated. It is contemplated that if the channel parameters have changed significantly, a warm start operation can not occur and a more involved cold start operation must occur. Alternatively, if at step 1510 the differences in channel parameters are not beyond the threshold value then the operation may initiate a warm start process by advancing to a step 1516. At step 1516, the communication devices adjust the receiver and transmitter setting to account for any changes in the channel parameters. Thereafter, at a step 1520 the operation initiates the warm start process.

FIG. 16 illustrates an operational flow diagram of an alternative method of operation. In the method described in FIG. 16, channel analysis is performed on a periodic basis and may be combined with wake-up sequence signal from the warm start process. For purposes of understanding, the steps in addition to the warm-start signal detection process described in FIG. 14 are shown in FIG. 15. In addition, this is but one possible and exemplary method of operation. Other methods that do not depart from the concepts described herein are contemplated.

In reference to FIG. 16, at a step 1602 the communication devices enter into a period of inactivity. The second communication device, the actions of which are shown in the rightmost portion of the figure, may assume a state of monitoring at a step 1600. The period of inactivity may be initiated due to a period of non-use of the communication devices by users of the communication devices. In response to the period of inactivity, the systems power down to save power during the period of non-use. This occurs at a step 1606. Thereafter, at a step 1610, the systems enter a wait state. Any time period may be selected for the duration of the wait state. After the wait state expires, during which power is being saved and noise on adjacent channels reduced, a first communication device generates a sequence signal, step 1614. In one embodiment the sequence signal comprises an M-sequence. In one embodiment the sequence signal is retrieved from memory instead of being generated.

After obtaining the sequence signal, the first communication device transmits the sequence signal at a step 1618. After transmission the first communication device may assume a state of monitoring at a step 1600.

Returning to operation of the second communication device, at a step 1626, the second communication device receives the signal sent by the first communication device. After receiving the signal, the second communication device correlates the signal to determine if it is a sequence signal of a particular pattern or simply noise or other signal on the line. At a step 1634, the second communication device processes and analyzes the correlated signal. If the received signal is a sequence signal then the processing and analyzing can be made to reveal information regarding the channel. Accordingly, at a step 1638 the second communication system may adjust the communication settings based on the processing and analysis. Thus during the wait state 1610, the channel parameters may have changed. The analysis of the received sequence signal will reveal these changes and the communication device settings may be adjusted accordingly.

At a step 1642 the second communication device enters a wait state. After the wait state at step 1642, the second communication device generates a sequence signal at step 1646 and transmits the sequence signal to the first communication device at a step 1650. As a result, at a step 1658 the first communication device receives the signal from the second communication device.

Thereafter, at a step 1654 the second communication device monitors for a signal from the first communication device. In this manner the cycle repeats. Thus, although not shown, the first communication device would then process and analyze the sequence signal sent at step 1660 to determine changes in the channel parameters. It may then adjust the setting of its communication system accordingly. In this manner the status of the communication channel may be monitored and changes to the settings of the communication system be made periodically. This advantageously keeps the systems prepared to initiate a warm start if such request is made by either communication device.

While various embodiments of the invention have been described, it will be apparent to those of ordinary skill in the art that many more embodiments and implementations are possible that are within the scope of this invention.

What is claimed is:

1. A communication device activation request system for restoring communication with a remote communication device, comprising:

a sequence signal generator configured to generate a sequence signal, wherein the sequence signal is capable of cross correlation or is capable of auto correlation;

a transmitter configured to receive and transmit the sequence signal; and a controller in communication with the sequence signal generator and the transmitter, the controller configured to:

receive a request for communication from the communication device, wherein the communication device is in a non-active state;

initiate generation of the sequence signal;

initiate transmission of the sequence signal by the transmitter, wherein the sequence signal can be cross-correlated at a remote receiver to request and initiate active communication;

send a restore active communication signal from the controller to the communication device after transmission of the sequence signal;

a receiver configured to exchange channel condition information with the remote communication device if the remote communication device cross correlates or auto correlates the sequence signal.

2. The system of claim 1, wherein the sequence signal generator is configured to generate an M-sequence.

3. The system of claim 1, wherein the communication device comprises a communication device operating under a digital subscriber line standard.

4. The system of claim 1, wherein the request for communication occurs after a period of inactivity entered into reduce power consumption of at least one communication device.

5. A wake-up signal detection system for use in a communication device, the detection system comprising:
   a receiver configured to receive a sequence signal;
   a correlator configured to correlate the received sequence signal;
   a comparator to compare the correlated received sequence signal to one or more threshold values;
   a controller configured to:
      analyze the output of the comparator;
      determine whether to initiate a warm start process based on the output of the comparator.

6. The detection system of claim 5, wherein the threshold values comprise predetermined signals or values that represent a signal indicative of a wake-up signal.

7. The detection system of claim 5, further including a response generator configured to generate a response signal for transmission to a device sending the sequence signal.

8. The detection system of claim 5, wherein a wake-up signal comprises a signal transmitted from a first communication device to a second communication device to request resumption of communication after a period of inactivity.

9. The detection system of claim 5, wherein the one or more threshold values comprises signal levels at one or more frequencies.

10. An apparatus for restoring operation of a communication system after a period of inactivity, the communication system comprising at least a first communication device and a second communication device, the system comprising:
    a sequence generator at the first communication device configured to generate a sequence signal upon request to initiate communication after a period of inactivity;
    a transmitter at the first communication device configured to transmit the sequence signal to the second communication device, the sequence signal intended to initiate operation of the second communication device;
    a receiver at the second communication device configured to receive the sequence signal;
    a correlator at the second communication device configured to correlate the received sequence signal;
    a signal processor at the second communication device configured to process the correlated signal to determine if the received signal is a sequence signal that signals a request to initiate operation.

11. The apparatus of claim 10, further including an activity detection system configured to provide an indication upon periods of inactivity between the first communication device and the second communication device, to the communication system.

12. The apparatus of claim 10, wherein the sequence signal is an M-sequence.

13. The apparatus of claim 10, wherein the signal processor is configured to compare points of correlation, if any, of the correlated signal, to a threshold signal to determine if the first communication device is requesting an initiation of communication.

14. The apparatus of claim 10, wherein the correlation comprises cross correlation.

15. The apparatus of claim 10, wherein the period of activity is intended to at least reduce the power consumption of a communication system.

16. A method for reducing power consumption of one or more communication devices during periods of inactivity comprising:
    detecting a period of inactivity;
    entering into a mode of reduced power consumption;
    receiving a request to resume communication;
    generating a sequence signal in response to the request;
    transmitting the sequence signal to a remote location to initiate communication, wherein the sequence signal comprises a wake up signal which is capable of cross-correlation and wherein the power level of the transmitted sequence signal is at a power level selected to not disturb adjacent channels.

17. The method of claim 16, further including monitoring and receiving signals at
    a remote location;
    correlating received signals;
    analyzing the correlated signal to determine if the received signal qualifies as a request to resume communication.

18. The method of claim 16, wherein the period of inactivity comprises a period of time when the one or more communication devices are not exchanging data.

19. The method of claim 16, wherein the request to resume communication comprises a request for data from a user of one or more communication devices.

20. The method of claim 16, further including periodically sending a channel monitoring signal to periodically obtain updated information regarding the channel.

21. A method for processing a received signal to determine if the received signal is a request to initiate a warm start operation, the method comprising:
    filtering the received signal to create a filtered signal;
    correlating the filtered signal with a sequence signal to generate a correlated signal;
    analyzing the points of correlation in the correlated signal to determine if the received signal is a request to resume communication.

22. The method of claim 21, wherein analyzing comprises comparing the correlated signal with a threshold signal to determine if the correlated signal is a request for a communication.

23. The method of claim 21, further including the step of initiation of a warm start operation if the analyzing reveals that the points of correlation match designated points of correlation.

24. The method of claim 21, wherein a finite impulse response filter is used to perform correlating.

25. The method of claim 21, wherein the received signal is a sequence signal.

26. A system for initiating a warm start operation comprising:
    means for generating a sequence signal, the sequence signal of the type predetermined to initiate a warm start and capable of cross-correlation;
    means for transmitting the sequence signal to a remote communication device to initiate communication;
    means for detecting a sequence signal and processing the sequence signal to determine if the sequence signal is a request for a warm start operation, wherein the processing comprises cross-correlation;
    means for initiating a warm start operation if the means for detecting determines the sequence signal is a request for a warm start operation.

27. The system of claim 26, wherein the means for detecting a signal comprises a correlator.

28. The system of claim 26, wherein the means for generating a sequence signal comprises a scrambler.

29. The system of claim 26, further including means for generating and transmitting an acknowledgement signal.

* * * * *